United States Patent [19]

Imaizumi et al.

[11] Patent Number: 5,714,569
[45] Date of Patent: Feb. 3, 1998

[54] ALIPHATIC POLYESTER RESIN AND METHOD FOR PRODUCING SAME

[75] Inventors: Mitsuhiro Imaizumi; Hideharu Kimura; Ryutaro Fujihira; Yasushi Ichikawa; Jun Suzuki; Yoshihiro Moteki, all of Kawasaki; Takashi Fujimaki, Yokohama; Eiichiro Takiyama, Kamakura, all of Japan

[73] Assignees: Showa Denko K.K.; Showa Highpolymer Co., Ltd., both of Tokyo, Japan

[21] Appl. No.: 696,997
[22] PCT Filed: Dec. 20, 1995
[86] PCT No.: PCT/JP95/02616
§ 371 Date: Aug. 21, 1996
§ 102(e) Date: Aug. 21, 1996
[87] PCT Pub. No.: WO96/19521
PCT Pub. Date: Jun. 27, 1996

[30] Foreign Application Priority Data

Dec. 21, 1994 [JP] Japan .................................. 6/318366

[51] Int. Cl.$^6$ .................................................. C08G 63/02
[52] U.S. Cl. .......................... 528/272; 264/176.1; 264/219; 528/176; 528/271
[58] Field of Search ............................. 264/176.1, 219; 528/176, 271, 272

[56] References Cited

FOREIGN PATENT DOCUMENTS

| 4189822 | 7/1992 | Japan . |
| 5170861 | 7/1993 | Japan . |
| 5178955 | 7/1993 | Japan . |
| 5178956 | 7/1993 | Japan . |

*Primary Examiner*—Terressa Mosley
*Attorney, Agent, or Firm*—Sughrue, Mion, Zinn, Macpeak & Seas, PLLC

[57] ABSTRACT

An aliphatic polyester resin having a λ value representing the magnitude of non-linearity of elongational viscosity of 1.5 to 8.0, said λ value being defined by the following formula (1):

$$\lambda = \lambda_1/\lambda_0 \qquad (1)$$

wherein $\lambda_0$ denotes the elongational viscosity at the transition point and $\lambda_1$ denotes the elongational viscosity when strain become twice that of a transition point, said transition point meaning a point between a linear region, i.e., the infinitesimal-deformation region, and a non-linear region, i.e., the large-deformation region. According to the present invention, an aliphatic polyester resin having excellent formability and forming stability as well as good biodegradability is provided.

12 Claims, 2 Drawing Sheets

Behavior of the elongational viscosity of A-1 and B-1

Behavior of the elongational viscosity of A-1 and B-1

(B1)

(A1)

(F1)

(H1)

ALIPHATIC POLYESTER RESIN AND METHOD FOR PRODUCING SAME

TECHNICAL FIELD

The present invention relates to an aliphatic polyester resin and a method for producing same having sufficient molecular weight for practical use and specific melt properties (excellent in melt tension and remarkable non-linear elongational viscosity characteristics). Particularly, the present invention relates to the aliphatic polyester resin and the method for producing it, with the resin having improved melt properties relative to prior resins as well as excellent forming stability, thickness uniformity and the like in any forming procedure.

BACKGROUND ART

Conventionally, although plastics are used in various industries, large amounts of plastic waste have the possibility of polluting rivers, oceans, and soil to become a great social problem. To prevent such pollution the development of biodegradable plastics has been desired; for example, poly(3-hydroxybutylate) produced by fermentation methods using microorganisms, blends of general-purpose plastics and starch, a naturally occurring polymer, and the like are already known. The former polymer has a drawback in that it is poor in molding properties because the polymer has a heat decomposition temperature close to its melting point and raw material efficiency is very bad because it is produced by microorganisms. On the other hand, since the naturally occurring polymer of the latter does not by itself have thermoplasticity, the polymer has defects in molding properties, and is greatly limited in its range of application.

On the other hand, although it is known that aliphatic polyesters are biodegradable, they have hardly been used because molecular weight high enough to achieve a practical molded product cannot be obtained. Recently, it has been found that a ring-opening polymerization of $\epsilon$-caprolactone produces a higher molecular weight polymer, and it has been proposed to use the polymer as a biodegradable resin. However, the resulting polymer is limited to only special applications because of a low melting point of 62° C. and the high cost thereof.

Therefore, some of the inventors of the present invention proposed high-molecular weight aliphatic polyesters having sufficient physical properties for practical use, for instance, in Japanese Patent Laid-Open Nos. 4-189823, 5-70579, 5-179016, and Japanese Patent Application No. 6-246445.

These aliphatic polyester resins exhibit excellent biodegradability and physical properties having a high utility value.

However, it has become apparent that, in comparison with popularly used resins such as polyethylene resins and polypropylene resins, the above-mentioned polyester resins still have the following problems that need to be improved: (i) moldability of the resins is sometimes impaired by drawdown in blow molding and in sheet thermoforming; (ii) the product loss sometimes increases in laminate molding and film casting because of an increase in neck-in; (iii) the stability of cells is occasionally impaired (due to open cells or open bubbles) to some extent in extrusion foam molding and bead foam molding using a chemical foaming agent and/or a volatile foaming agent; (iv) the stability of film-forming is sometimes impaired to some extent in inflation film forming, resulting in poor appearance of the rolled film; and (v) in stretch blow molding, molding becomes sometimes impossible because the thickness of products becomes uneven so that some holes occur during the stretching process.

Further, the thickness uniformity and form stability of the aliphatic polyester resins should be improved.

The following means may be used to overcome the foregoing problems: controlling the molecular weight of aliphatic polyester resins to an optimum value; elevating the temperature controlling level of molding machines; and improvement of devices for molding machines, such as improvement of air rings or stabilizing plates used for inflation film forming. However, by using these means it is difficult to obtain a large increase, e.g., 20 to 30%, in the molding rate.

Conventional low density polyethylene is advantageously blended in polypropylene to improve the moldability thereof. However since the above kind of polyethylene is a non-biodegradable component, it is not preferable to mix such component with an aliphatic polyester resin even if the moldability of the resin is elevated.

An object of the present invention is therefore to provide an aliphatic polyester resin and a method of producing same, which can solve the afore-mentioned problems and exhibit the following advantages: excellent melting characteristics, such as excellent moldability for various kinds of molding methods; sufficient physical properties for practical use; a small combustion calorific value in the case of disposal after use; and biodegradable by microorganisms, which means easy disposal.

DISCLOSURE OF INVENTION

The inventors of the present invention have investigated various kinds of polymerizing and manufacturing conditions to obtain a high molecular aliphatic polyester having sufficient physical properties for practical use and excellent melt properties, for instance, superior melt tension and large non-linearity in elongational viscosity. As a result, an aliphatic polyester resin having specific melt properties and a specific molecular range was obtained, which exhibits excellent characteristics for each of various kinds of molding methods while maintaining biodegradability. It was also found that the moldability of the resin was largely elevated in blow molding (including direct blow and stretching blow), sheet thermoforming, extrusion foam molding, bead foam molding, inflation film forming, laminate molding, casting film, and the like. From the above, the present invention was achieved.

In other words, the present invention provides an aliphatic polyester resin having a $\lambda$ value representing the magnitude of non-linearity of elongational viscosity of 1.5 to 8.0, said $\lambda$ value being defined by the following formula (1):

$$\lambda = \lambda_1/\lambda_0 \quad (1)$$

wherein $\lambda_0$ denotes the elongational viscosity at a transition point and $\lambda_1$ denotes the elongational viscosity when strain becomes twice that of a transition point, transition point meaning the point between a linear region (infinitesimal-deformation region) and a non-linear region (large-deformation region).

Further, the present invention provides the aliphatic polyester resin in which swell measured at 190° C. is 40 to 200%.

Furthermore, the present invention provides the aliphatic polyester resin having a melt viscosity of $1.0\times10^3$–$1.0\times10^6$ poises at a temperature of 190° C. and a shear rate of 100 $sec^{-1}$, and having a melting point of 70°–160° C.

Still further, the present invention provides the aliphatic polyester resin having a weight-average molecular weight of at least 20,000.

Yet further, the present invention provides the aliphatic polyester resin consisting of an aliphatic glycol (including cyclic ring) and an aliphatic dicarboxylic acid and having a weight-average molecular weight (Mw) of at least 20,000.

Further, the present invention provides the aliphatic polyester resin mainly constituted by the aliphatic glycol and the aliphatic dicarboxylic acid, the resin being obtained by reacting the glycol and the dicarboxylic acid with at least one polyfunctional compound selected from the group consisting of tri- or more polyol (or anhydride), tri- or more oxycarboxylic acid (or anhydride) and tri- or more polycarboxylic acid (or anhydride), and a resin having a weight-average molecular weight (Mw) of at least 20,000 provided with long chain branched formation.

Furthermore, the present invention provides a aliphatic polyester resin containing an urethane bond of 0.03 to 3.0% by weight.

Still further, the present invention provides the aliphatic polyester resin obtained by reacting 100 parts by weight of an aliphatic polyester prepolymer having a weight-average molecular weight of at least 20,000 and having a melting point of at least 60° C. with 0.1 to 5 parts by weight of diisocyanate.

Yet further, the present invention provides the aliphatic polyester resin having a repeated chain structure of the prepolymer through the urethane bond.

Further, the present invention provides the aliphatic polyester resin in which one part or all of the aliphatic polyester resin has a repeated chain structure of the prepolymer through the urethane bond mainly constituted by the aliphatic glycol and the aliphatic dicarboxylic acid, the prepolymer being obtained by reacting the glycol and the dicarboxylic acid with at least one polyfunctional compound selected from the group consisting of tri- or more polyol (or anhydride), tri- or more oxycarboxylic acid (or anhydride) and tri- or more polycarboxylic acid (or anhydride), and the prepolymer having a weight-average molecular weight (Mw) of at least 20,000 provided with long chain branched formation.

Furthermore, the present invention provides the aliphatic polyester resin having a unit selected from the group consisting of ethylene glycol, propylene glycol, butanediol, 1,6-hexanediol, decamethylene glycol, neopentyl glycol and 1,4-cyclohexanedimethanol as an aliphatic glycol unit, and having a unit selected from the group consisting of oxalic acid, succinic acid, adipic acid, suberic acid, sebasic acid, dodecanoic acid, succinic anhydride and adipic anhydride as an aliphatic dicarboxylic acid unit.

Still further, the present invention provides the aliphatic polyester resin containing as tri- or tetra-functional polyol as the third component at least one selected from the group consisting of trimethylol propane, glycerine and pentaerythritol.

Yet further, the present invention provides the aliphatic polyester resin containing as tri- or tetra-functional oxycarboxylic acid and/or tri- or tetra-functional polycarboxylic acid at least one selected from the group consisting of trimesic acid, propane tricarboxylic acid, trimellitic anhydride, pyromellitic anhydride, benzophenone tetracarboxylic anhydride, cyclopentane tetracarboxylic acid, malic acid, citric acid and tartaric acid.

Further, the present invention provides the aliphatic polyester resin in which one part or all of the aliphatic polyester resin is mainly constituted by the aliphatic glycol and the aliphatic dicarboxylic acid, the resin being obtained by reacting the prepolymer having a weight-average molecular weight (Mw) of at least 20,000 with polyisocyanate, and the resin having a weight-average molecular weight (Mw) of at least 100,000 provided with longer chain branched formation.

Furthermore, the present invention provides the aliphatic polyester resin in which the polyisocyanate is trimethylol propane.hexamethylene diisocyanate.adduct, cyclic hexamethylene diisocyanate trimer or hexamethylene diisocyanate.water.adduct.

Still further, the present invention provides a method for producing the aliphatic polyester resin comprising blending 3 to 500 parts by weight of the aliphatic polyester resin with 100 parts by weight of an aliphatic polyester resin having λ value indicating the magnitude of non-linearity of the elongational viscosity of 1.5 or less so that the λ value becomes the specific value in a range of 1.5 to 8.0.

Yet further, the present invention provides a method for producing the aliphatic polyester resin comprising blending 3 to 500 parts by weight of the aliphatic polyester resin with 100 parts by weight of an aliphatic polyester resin having swell measured at 190° C. of 40% or less so that the swell becomes a specific value in a range of 40 to 200%.

The present invention will be described below in further detail.

The aliphatic polyester resin according to the present invention must have a λ value indicating the magnitude of non-linearity of the elongational viscosity of 1.5 to 8.0. This aliphatic polyester resin will be further illustrated below.

The aliphatic polyester resin of the present invention mainly consists of a polyester obtained by reacting two components of glycols and dicarboxylic acid (or acid anhydrides thereof), and if necessary as a third component, with at least one polyfunctional component selected from the group consisting of trifunctional or tetrafunctional polyols, oxycarboxylic acids, and polybasic carboxylic acids (or acid anhydrides thereof). The aliphatic polyester resin may be one which has hydroxyl groups at ends and which may be highly polymerized. Further, the aliphatic polyester may be reacted with a coupling agent so as to make it even higher molecular weight, which is preferable for enhanced toughness.

In the present specification, the term "aliphatic polyester" sometimes means the absence of urethane bonds.

It has been known to obtain polyurethane by reacting a low molecular weight polyester prepolymer having a number-average molecular weight of 2,000–2,500, which has hydroxyl groups as the terminal groups, with diisocyanate as a coupling agent in the preparation of rubber, foam, coatings and adhesives.

However, the polyester prepolymers used in these polyurethane foams, coatings and adhesives are prepolymers having a low molecular weight and a number-average molecular weight of 2,000–2,500 which is the maximum that can be prepared by non-catalytic reaction. To obtain practical physical properties as the polyurethane, it is necessary that the content of diisocyanate should be as much as 10–20 parts by weight in relation to 100 parts by weight of this low molecular weight prepolymer. When such a large amount of diisocyanate is added to the low molecular weight polyester melted at 150° C. or higher, gelation occurs so that normal resins which can be molded in the form of a melt cannot be obtained.

Therefore, polyesters which are obtained by the reaction of a large amount of diisocyanate as a raw material for such low molecular weight polyester prepolymers cannot be used as the raw material for the various molding materials of the present invention.

Also, as shown in the case of polyurethane rubber, although a method is conceivable in which hydroxyl groups are converted into isocyanate groups by the addition of diisocyanate, and then the number-average molecular weight thereof is further increased by using glycols, the same problem as mentioned above arises because 10 parts by weight of diisocyanate relative to 100 parts by weight of the prepolymer should be used in order to obtain practical physical properties.

When a relatively high molecular weight polyester prepolymer is to be used, heavy metal catalysts required to prepare the prepolymer would promote the reactivity of the above-mentioned isocyanate groups, undesirably causing poor preservativity, and the generation of crosslinking and branching; hence a number-average molecular weight of not more than around 2,500 (corresponding to a weight-average molecular weight of about 5,000) of polyester prepolymers would be the limit if they were to be prepared without catalysts.

The polyester prepolymers to obtain the aliphatic polyester resin used in the present invention are relatively high molecular weight saturated aliphatic polyesters having substantially hydroxyl groups at the ends thereof, weight-average molecular weights of at least 20,000, preferably at least 40,000, and melting points of 60° C. or higher, which are obtained by reacting glycols and polybasic carboxylic acids (or acid anhydrides thereof) in the presence of catalysts. When a prepolymer having a weight-average molecular weight of lower than 20,000 is used, the small amounts, i.e. 0.1-5 parts by weight, of coupling agents used in the present invention cannot provide polyesters having good physical properties. When a polyester prepolymer having a weight-average molecular weight of 20,000 or higher is used, the use of small amounts of coupling agents even under severe conditions such as a molten state and the like can produce polymeric polyesters, without gelation.

That is, the aliphatic polyester resin of the present invention may be a linear polymer, as one embodiment, in which the prepolymer consisting of the aliphatic glycol and aliphatic dicarboxylic acid, which has a weight-average molecular weight of 20,000 or more, preferably 40,000 or more is combined through the urethane bond derived from, for example, diisocyanate as a coupling agent.

Further, in the present invention, the above prepolymer may have an extremely wide molecular weight distribution and/or branched long chains due to the polyfunctional components. This prepolymer may be reacted with, for example, a polyisocyanate as a coupling agent to obtain an aliphatic polyester resin having branched long chains combined through the urethane bonds. When oxazoline, epoxy compounds, and acid anhydrides are used as a coupling agent, the polyester prepolymer has a chain structure through the ester bond rather than urethane bonds.

In addition, the aliphatic polyester of the present invention may be obtained by a catalytic reaction between glycol and polybasic acids (or anhydrides thereof) proceeding for long hours, such as 10 to 40 hours, more preferably, for 12 to 24 hours, and most preferably, for 16 to 20 hours. The thus-obtained aliphatic polyester has terminal groups substantially comprising hydroxyl group and is relatively high-molecular. The weight-average molecular weight of the aliphatic polyester is 20,000 or more and, more preferably, 40,000 or more. The resin may be a saturated aliphatic polyester having a melting point of 60° C. or more (the foregoing reaction being carried out without using coupling agents).

This aliphatic polyester has a significantly broad molecular-weight distribution and/or can possess a long-chain branch due to a polyfunctional component. The aliphatic polyester can be used alone. Further, a mixture of the aliphatic polyesters having different components may also be used. Furthermore, the aliphatic polyester may be used as one component of a composition including linear polymers. The molecular weight of the aliphatic polyester having the above long-chain branched structure may be further raised by the foregoing coupling reaction, if required.

The components used in the present invention will be discussed below in further detail.

Examples of aliphatic glycols which can be used to produce the aliphatic polyester resin of the present invention include ethylene glycol, propylene glycol, butanediol, 1,6-hexanediol, decamethylene glycol, neopentyl glycol, 1,4-cyclohexanedimethanol and the like. Ethylene oxides may also be used. These glycols can be used in combination.

Examples of aliphatic dicarboxylic acids or anhydrides thereof include oxalic acid, succinic acid, adipic acid, suberic acid, sebasic acid, dodecanoic acid, succinic anhydride, adipic anhydride and the like. Generally, these aliphatic dicarboxylic acids are commercially available and they are useful for the present invention. The aliphatic dicarboxylic acids (or anhydrides thereof) can be used in combination.

(Third component)

To these aliphatic glycols and aliphatic dicarboxylic acids, a third component comprising at least one polyfunctional component selected from the group consisting of trifunctional or tetrafunctional polyols, oxycarboxylic acid, and polybasic carboxylic acids (or acid anhydrides thereof) may be added if necessary. The addition of this third component, which causes the branching of long chains and which, in its elongational viscosity behavior, shows a non-linear range following the linear range, can impart desirable properties including moldability because the ratio of weight-average molecular weight (MW)/number-average molecular weight (Mn), i.e., the molecular weight distribution, increases with increases in its molecular weight.

In terms of the amount of polyfunctional components to be added without fear of gelation, a trifunctional component of 0.1 to 2 mol %, preferably 0.1 to 1.8 mol %, more preferably 0.1 to 1.5 mol % or a tetrafunctional component of 0.1 to 1 mol %, preferably 0.1 to 0.8 mol % is added relative to 100 mole % of the total of aliphatic dicarboxylic acid (or acid anhydride thereof) components. With less than 0.1 mol %, effects represented by the moldability do not appear. Further, with more than 2 mol %, gelation components increase and practicability is remarkably reduced. The added amount is dependent upon desirable molding methods in the above ranges.

(Polyfunctional components)

Examples of polyfunctional components as the third component include trifunctional or tetrafunctional polyols, oxycarboxylic acids, and polybasic-carboxylic acids.

The trifunctional polyols representatively include trimethylol propane, glycerin or anhydrides thereof.

The tetrafunctional polyols representatively include pentaerythritol.

The trifunctional oxycarboxylic acid components are divided into the two types of (i) a component which has two carboxyl groups and one hydroxyl group in one molecule, and (ii) another component which has one carboxyl group and two hydroxyl groups in one molecule. Malic acid which has two carboxyl groups and one hydroxyl group in one molecule becomes practical and sufficient for the purposes of the present invention.

The tetrafunctional oxycarboxylic acid components are the following three types of components:

(i) A component which has three carboxyl groups and one hydroxyl group in one molecule;
(ii) Another component which has two carboxyl groups and two hydroxyl group in one molecule; and
(iii) The remaining component which has three hydroxyl groups and one carboxyl group in one molecule. Any type can be used, though in view of commercial availability at low cost, citric acid and tartaric acid are practical and sufficient for the purposes of the present invention.

As a trifunctional polybasic carboxylic acid (or acid anhydride thereof) component trimesic acid, propane tricarboxylic acid and the like can be used. Among them, trimesic anhydride is practical for the purposes of the present invention.

As a tetrafunctional polybasic carboxylic acid (or anhydride thereof) various types of aliphatic compounds, cycloaliphatic compounds, aromatic compounds and the like, described in certain publications, can be used. In terms of commercial availability, pyromellitic anhydride, benzophenone tetracarboxylic anhydride and cyclopentane tetracarboxylic anhydride for example are practical and sufficient for the purposes of the present invention.

These glycols and dibasic acids mainly consist of aliphatic series, while small amounts of other components, for example, aromatic series may be concomitantly used. These other components may be blended or copolymerized in amounts up to 20% by weight, preferably up to 10% by weight, and more preferably up to 5% by weight because using these compounds degrades biodegradability.

The polyester prepolymer or the aliphatic polyester used in the present invention has hydroxyl groups at the terminals. To introduce the hydroxyl groups, it is necessary that glycols be used somewhat excessively.

For preparation of the polyester prepolymer or the aliphatic polyester having a relatively high molecular weight, it is necessary to use deglycol-reaction catalysts in the deglycol reaction subsequent to the esterification. The deglycol reaction may be conducted under highly reduced pressure at 5 mmHg or less, preferably 1 mmHg or less in the presence of catalysts.

Examples of the deglycol-reaction catalysts include titanium compounds such as acetoacetoyl type titanium chelate compounds and organic alkoxy titanium compounds and the like. These titanium compounds can be used in combination. Examples of compounds used in combination include diacetoacetoxy oxytitanium (Nippon Chemical Industry Co., Ltd.; Nursem Titanium) tetraethoxy titanium, tetrapropoxy titanium, tetrabutoxy titanium and the like. The amount of the titanium compound used is 0.001–1 part by weight, and preferably 0.01–0.1 part by weight relative to 100 parts by weight of the polyester prepolymer. These titanium compounds may be blended before the esterification, or may be blended immediately before the deglycol reaction.

To the polyester prepolymer are added coupling agents in order to increase its number-average molecular weight.

Examples of the coupling agents include polyisocyanate, oxazoline, diepoxy compounds, acid anhydrides and the like. Di- or tri-isocyanate is particularly preferred because little gelation occurs.

In the cases of oxazoline and diepoxy compounds, it is necessary that the terminal hydroxyl groups are reacted with acid anhydrides and the like to convert them into carboxyl groups, then coupling agents are used.

Although not limited, examples of diisocyanate include 2,4-tolylene diisocyanate, a mixture of 2,4-tolylene diisocyanate and 2,6-tolylene diisocyanate, diphenylmethane diisocyanate, 1,5-naphthylene diisocyanate, xylylene diisocyanate, hydrogenated xylylene diisocyanate, hexamethylene diisocyanate, isophorone diisocyanate and the like. Particularly, hexamethylene diisocyanate is preferably used in terms of prepared resin hue, reactivity at the time of blending polyesters, and the like.

The adding amounts of these coupling agents are 0.1–5 parts by weight, and preferably 0.5–3 parts by weight relative to 100 parts by weight of the prepolymer. Addition of less than 0.1 part by weight causes insufficient coupling reaction, whereas with more than 5 parts by weight gelation tends to occur.

Further, in order to elevate the number-average molecular weight and the weight-average molecular weight, and introduce relative long chain branches (hereinafter referred to as LCB) into the polymer, the following polyfunctional coupling agents may be used as part of the foregoing coupling agents or in substitute thereof.

Preferably, tri-functional isocyanate and tetra-functional isocyanate, in particular tri-functional isocyanate, may be used as a polyfunctional coupling agent. Although there is no particular restriction to the kind of tri-functional isocyanate, for instance, trimethylolpropane.hexamethylenediisocyanate.adduct, cyclic hexamethylenediisocyanate trimer or hexamethylene diisocyanate.water.adduct are exemplified. In addition, methyl acetate, hexane, heptane, toluene, xylene and the like may be employed as a diluent where these polyfunctional coupling agents are used. For instance, an aliphatic polyester resin of the LCB type can be obtained as follows: 1 mole of succinic acid and 1 to 1.1 moles of 1,4-butanediol are esterified and deglycolized to produce prepolymers having a weight-average molecular weight of 20,000 or more, and preferably, 40,000 or more; 100 parts by weight of the thus-obtained prepolymers are reacted with 0.1 to 1 part by weight of diisocyanate to elevate the weight-average molecular weight to 50,000 or more, and then, further reacted with 0.1 to 4 parts by weight of tri-functional isocyanate to increase the weight-average molecular weight to 100,000 or more. If the amount of the tri-functional isocyanate is less than 0.1 part by weight, the effect thereof is small. Whereas, if the amount is more than 4 parts by weight, gels can undesirably mix readily in the resultant aliphatic polyester resin.

The addition is preferably performed when the prepolymer is in a uniformly melted state under easily stirrable conditions. Although it is not impossible for the coupling agents to be added to the prepolymer in the solid state and melted and mixed through an extruder, adding the agents in a polyester preparation unit, or adding them to the prepolymer in a melted state (for example, in a kneader) is more practical.

The thus-obtained aliphatic polyester resin of the present invention is required to have a λ value in a range of from 1.5 to 8.0, which λ value represents non-linearity in elongational viscosity. By setting the λ value in the foregoing range, the aliphatic polyester resin of the present invention can be preferably applied to various kinds of molding machines generally used for thermoplastic resin. By investigating the appropriate melt properties specific for each of the molding methods it becomes apparent that problems occurring in conventional techniques are avoidable if the λ value is maintained in a range of from 1.5 to 8.0. Thus, the λ value can be set in a wide range such as above, a surprising and unexpected fact, considering the prior art.

The λ value is represented by the following formula (1):

$$\lambda = \lambda_1 / \lambda_0 \qquad (1)$$

wherein $\lambda_0$ denotes an elongational viscosity at the transition point and $\lambda_1$ denotes an elongational viscosity when strain becomes twice that of at the transition point. In the above meaning, the transition point is a point between a linear region, i.e., the infinitesimal-deformation region, and a non-linear region, i.e., the large-deformation region.

The following elongational viscosity was measured by a monoaxial tensile stress meter (Melten Rheometer) manufactured by Toyo Seiki Co., Ltd. such that uniform strands, as samples, with a diameter of 2.0 to 6.0 mm were prepared at a setting temperature of 190° C. by using a capillary rheometer manufactured by Toyo Seiki Co., Ltd., and then, subjected to measurement at a strain rate of 0.1 $\sec^{-1}$ and at a temperature 30° C. higher than the melting point of the samples estimated by DSC. Practically, the transition point was determined as a separation point of the linear region and the non-linear region by comparison with a line obtained from measurement at a strain rate of 0.03 $\sec^{-1}$, as is shown in FIG. 1. Further before the measurement, the samples were sufficiently preheated in a silicone oil so as to remove residual strain. After setting the samples to a roller, the roller was slightly rotated to remove surface waviness of the samples before starting measurment.

The preferable $\lambda$ value is in a range of from 1.5 to 8.0 and, in particular, from 1.8 to 7.5, as described above. When the $\lambda$ value is less than 1.5, sufficient strain hardening cannot be obtained, thus the resultant resin exhibits inferior uniformity in thickness and insufficient molding stability. Meanwhile, if the value exceeds 8.0, gelation, fish-eyes or the like frequently appear and, in the worst case, the melt flow of the resin is reduced so that molding becomes impossible. However, the optimum range varies depending on the kinds of molding methods, as shown below.

The following examples are the preferable $\lambda$ value for each of the molding methods:

For gas foam molding of which the expansion ratio is medium to high, i e., 4 to 80, the preferable $\lambda$ value is in a range of from 3.0 to 8.0 and, in particular, from 4.5 to 8.0. When the $\lambda$ value is less than 3.0, the stability and uniformity of cells may become inferior, particularly in the case of a high expansion ratio of more than 10. Meanwhile, if the $\lambda$ value exceeds 8.0, the extrusion characteristics worsen, thus impairing the molding stability.

For foam molding in which the expansion ratio is small, i.e., 1.1 to 5, and in which a chemical foaming agent is mainly employed, the preferable $\lambda$ value is in a range of from 2.5 to 8.0 and, in particular, from 2.5 to 7.0. When the $\lambda$ value is less than 2.5, the stability and uniformity of cells may become inferior. Meanwhile, if the $\lambda$ value exceeds 8.0, the extrusion characteristics may become worse, thus impairing the molding stability and cost.

In bead foam molding, the preferable $\lambda$ value is largely affected by the final expansion ratio and is in a range of from 1.5 to 8.0 and, in particular, from 2.0 to 7.0. When the $\lambda$ value is less than 1.5, the stability and uniformity of cells become inferior. Meanwhile, if the $\lambda$ value exceeds 8.0, cell-cracks occur due to gelation, etc., and further, the fusing characteristics tend to be inferior at the time of mold-foaming.

In extrusion laminate molding, the preferable $\lambda$ value is in a range of from 3.0 to 7.0 and, in particular, from 4.5 to 6.5. When the $\lambda$ value is less than 3.0, neck-in may increase or both sides of the laminated film may become thicker. Meanwhile, if the $\lambda$ value exceeds 7.0, gelation and fish-eyes may occur frequently, impairing appearance and printability.

In T-dye film forming, the preferable $\lambda$ value is in a range of from 2.0 to 7.0 and, in particular, from 2.5 to 6.5. When the $\lambda$ value is less than 2.0, neck-in may increase. Meanwhile, if the $\lambda$ value exceeds 7.0, gelation and fish-eyes occur easily, impairing the appearance and printability.

In inflation film forming, the preferable $\lambda$ value is in a range of from 1.5 to 7.0 and, in particular, from 1.7 to 5.0. When the $\lambda$ value is less than 1.5, the thickness distribution becomes larger, and further, the film-forming stability is impaired, resulting in lumps, surface waviness, thick portions and the like. Meanwhile, if the $\lambda$ value exceeds 7.0, gelation and fish-eyes may occur, impairing appearance and printability. In addition, the cost thereof becomes somewhat undesirable.

For blow molding, the preferable $\lambda$ value is in a range of from 1.5 to 7.0 and, in particular, from 2.5 to 7.0, though the value varies to some extent depending on the size of the articles. When the $\lambda$ value is less than 1.5, drawdown readily occurs due to a shortage of melt tension. Further the thickness uniformity after blowing is also impaired. Meanwhile, if the $\lambda$ value exceeds 7.0, gelation and fish-eyes may occur, impairing the appearance and printability. In addition,-the cost thereof becomes somewhat undesirable. Resins used for medium or large articles preferably have a larger $\lambda$ value within the foregoing range, as compared with the small articles.

For stretch blow molding, the preferable $\lambda$ value is in a range of from 1.5 to 6.0 and, in particular, from 1.5 to 5.0. When the $\lambda$ value is less than 1.5, thick portions are readily produced during longitudinal stretching by a rod and blowing up, and in the worst case, holes occur making blowing up impossible, thus providing no articles. Meanwhile, if the $\lambda$ value exceeds 6.0, cost becomes somewhat undesirable.

For sheet forming (vacuum forming), the preferable $\lambda$ value is in a range of from 2.0 to 7.0 and, in particular, from 2.5 to 7.0. When the $\lambda$ value is less than 2.0, noticeable sagging occurs during vacuum (thermo) forming, and further, if vacuum forming machines with a width of 1040 mm, as commonly used in Japan, are employed, unevenness in the finished articles become so large that excellent products cannot be obtained in some cases, depending on the shape thereof. Meanwhile, ii the $\lambda$ value exceeds 7.0, gelation and fish-eyes occur, thus sometimes impairing the appearance and, in the worst case, causing holes. Further, a method of increasing molecular weight may be employed at the same time to decrease sagging, as long as the extrusion characteristics are not impaired.

For manufacturing a biaxially oriented film by a tenter and inflation method, the preferable $\lambda$ value is in a range of from 2.0 to 7.0 and, in particular, from 2.5 to 6.0. When the $\lambda$ value is less than 2.0, film-cracks may readily occur due to nonuniform extension during stretching. Meanwhile, if the $\lambda$ value exceeds 7.0, gelation and fish-eyes may occur, sometimes causing film-cracks and impairing extension. In addition, this can cause inferior printability.

The aliphatic polyester resin of the present invention is mainly characterized in that the $\lambda$ value thereof is within a specific range as above. However, if the swell value thereof is considered as the second melt property, a resin with another level of improved molding properties can be attained.

The swell value described below is determined as follows: a 2.0 cm sample of flow from a melt indexer for the MFR measurement specified by JIS K6760 at 190° C. under a load of 2.16 kgf is cut and the diameter measured at a point 5.0 mm from the bottom end. Swell is calculated from the following equation:

$$\text{Swell} = \{(\text{diameter of sample} - 2.095)/2.095\} \times 100$$

The swell range is preferably 40 to 200%, and more preferably 45 to 150% in the aliphatic polyester resins in accordance with the present invention. A swell of less than 40% sometimes causes poor thickness uniformity or poor molding stability, whereas a swell exceeding 200% causes gelation and fish eye formation, resulting in difficult molding due to decreased melt flowability in severer cases, thus resulting in economical disadvantages. However, there is an optimum range for most molding methods just like with the λ value. Examples of preferable swell values in various molding methods are as follows:

The swell value range is preferably 50 to 200%, and more preferably 60 to 180%, in gas foaming molding. A swell of less than 50% causes unstable and nonuniform cells. Further, when a foamed board article having a thickness over 5 mm is produced, a resin having a relatively high swell value within the range is preferably used. When a swell exceeds 200%, stable molding cannot be achieved due to poor extruding characteristics.

In low expansion ratio foam molding (expansion ratio: 1.1 to 5.0 times) mainly using chemical foaming agents, the swell is preferably 40 to 120%, and more preferably 40 to 100%. A swell of less than 40% causes unstable and nonuniform cells, whereas a swell exceeding 120% sometimes causes economical disadvantages, as well as poor extrusion characteristics and unstable molding although depending on the screw shape of the molding machine.

In bead foam molding, the moldability greatly depends on its final expansion ratio, and the swell preferably ranges from 40 to 150%, and more preferably from 40 to 120%. A swell of less than 40% causes unstable and nonuniform cells, whereas a swell over 150% may cause open bubbles probably due to gelation.

In extruding laminate molding, the swell preferably ranges from 40 to 200%, and more preferably from 60 to 150%. When the swell is less than 40%, neck-in is noticeable, i.e., both ends of the laminate film become thick, occasionally resulting in increased production loss. On the other hand, since a swell over 200% causes large amounts gelation and fish eye formation in the film appearance and printability are deteriorated.

In T-die film forming, the swell preferably ranges from 40 to 150%, and more preferably from 40 to 100%. When the swell is less than 40%, neck-in is noticeable, i.e., both ends of the laminate film become thick. On the other hand, since a swell over 150% causes gelation and fish eye formation in large amounts, the film appearance and printability are deteriorated.

In inflation film forming, the swell ranges from 40 to 100%, and preferably from 40 to 80%. When the swell is less than 40%, the thickness uniformity is deteriorated and the film cannot be stably formed. Thus, the molding speed cannot be increased. On the other hand, a swell over 100% impairs physical properties, such as tear strength, as well as increases cost.

In blow molding, the swell preferably ranges from 40 to 200%, and more preferably from 50 to 150%, although it depends on the size of the molded article. When the swell is less than 40%, some drawdown may occur probably due to its decreased melt tension. Also thickness uniformity after blow up may not be secured in some cases. On the other hand, since the swell over 200% causes large amounts gelation and fish eye formation film appearance and printability are deteriorated, with economical disadvantages. When an article having a larger size is molded, a resin having a larger swell value is preferably used.

In stretching blow molding, the swell preferably ranges from 40 to 120%, and more preferably from 40 to 100%. A swell of less than 40% may form holes and nonuniform thickness during the longitudinal stretching from a rod and blow up. A swell over 100% is somewhat uneconomic.

When a biaxially stretched film is produced using a tenter or inflation method, the swell preferably ranges from 40 to 100% and more preferably from 45 to 80%. When the swell is less than 40%, the cells are readily ruptured during stretching probably due to nonuniform stretching, resulting in decreased productivity. On the other hand, swell over 100% may cause economical disadvantages, increased gelation and fish eyes, cell rupture, and deteriorated appearance and printability.

When the melt viscosity is taken account of as the third melt property in the present invention, an aliphatic polyester resin having a further improved moldability can be provided.

Although the melt viscosity varies in accordance with desired molding method and applications, it is preferable to have a melt viscosity of $1.0 \times 10^3$–$1.0 \times 10^6$ poise, preferably $5.0 \times 10^3$–$5.0 \times 10^5$ poise, and more preferably $7.0 \times 10^3$–$1.0 \times 10^5$ poise at a temperature of 190° C. at a shear rate of 100 $sec^{-1}$.

If the melt viscosity is less than $1.0 \times 10^3$ poise, it is difficult to applied to some types of molding methods due to its low viscosity. Further, with more than $1.0 \times 10^6$ poise, extrudability is lowered due to the high viscosity which might cause poor moldability in practical.

The melt viscosity at a shear rate of 100 $sec^{-1}$ was calculated from a graph which shows the relationship between the apparent viscosities and the shear rates measured by a capillary rheometer using a nozzle having a diameter of 1.0 mm and L/D of 10 at a resin temperature of 190° C.

The melting point of the aliphatic polyester resin used in the present invention is preferably 70° to 160° C., more preferably 80° to 150° C., especially 80° to 140° C. A melting point lower than 70° C. will give the resin poor heat resistance, whereas at higher than 160° C. it is difficult to carry out molding and biodegradability becomes poor.

To achieve a melting point higher than 70° C. the prepolymer needs to have a melting point of at least 60° C.

When urethane bonds are contained in the aliphatic polyester resin used in the present invention, the amount of urethane bonds is preferably 0.03 to 3.0% by weight, more preferably 0.1 to 2.0% by weight, and most preferably 0.5 to 1.5% by weight.

The amount of urethane bonds is measured by $^{13}$C NMR, showing good correlation with the charged amount.

Less than 0.03% by weight of urethane bonds has little effect on polymerization and leads to poor molding properties, whereas more than 3% by weight causes gelation.

Further, the combustion heat generated from the aliphatic polyester resin of the present invention and molded articles thereof is 6,000 cal/kg or less, which is lower than those of polyethylene and polypropylene, thus facilitating incineration thereof where the resins are not processed by biodegradation.

It is needless to say that when the above-mentioned aliphatic polyester resin is used, antioxidants, thermal stabilizers, UV absorbers as well as lubricants, waxes, coloring agents, crystallizing promoters and the like can be used concomitantly if necessary.

That is, antioxidants include hindered phenol antioxidants such as p-tert-butyl hydroxytoluene and p-tert-butyl hydroxyanisole, sulfur antioxidants such as distearyl thiodipropionate and dilauryl thiodipropionate, and the like; heat stabilizers include triphenyl phosphite, trilauryl phosphite, tris-nonylphenyl phosphite and the like; UV absorbers include p-tert-butyl phenyl salicylate, 2-hydroxy-4-methoxybenzophenone, 2-hydroxy-4-methoxy-2'-carboxybenzophenone, 2,4,5-trihydroxybutylophenone and the like; lubricants include calcium stearate, zinc stearate, barium stearate, sodium palmitate and the like; antistatic agents include N,N-bis(hydroxyethyl) alkyl amine, alkyl amine, alkyl allyl sulfonate, alkyl sulfonate and the like; flame retarders include hexabromocyclododecane, tris-(2,3-dichloropropyl) phosphate, pentabromophenyl allyl ether and the like; anti-blocking agents include the combination of inorganic fillers such as silica and oleamide and the like; inorganic fillers or nucleating agents include calcium carbonate, silica, titanium oxide, talc, mica, barium sulfate, alumina, mixture of $NaHCO_3$ and citric acid and the like; crystallizing promoters include polyethylene terephthalate, poly-transcyclohexane dimethanol terephthalate and the like; organic fillers include wood powder, rice hull, wastepaper such as newspaper, starches (including modified materials such as alpha-starch), cellulose and the like.

Prior art aliphatic polyester resins having a λ value of less than 1.5 also can be used in the present invention by blending with aliphatic polyester resins having a λ value of 1.5 to 8.0 in accordance with the present invention in a predetermined mixing ratio. Such blending is one of the characteristic features in the process of the present invention. In such a case, 3 to 500 parts by weight of the aliphatic polyester resin in accordance with the present invention may be blended to 100 parts by weight of the aliphatic polyester resin having a λ value of less than 1.5.

Although not limited thereto, blending methods include dry blending and/or melt kneading. Another example of blending methods is as follows: Both polymers are pre-blended with a tumbling mixer or Henschel mixer then blended at a temperature higher than the melting point of the resin by 30° to 120° C., preferably 40° to 100° C., and more preferably 50° to 90° C., in a uniaxial or biaxial extruder. When the kneading temperature is not 30° C. higher than the melting point, the extrusion load is too large. On the other hand, temperatures exceeding the melting point by more than 120° C. cause the deterioration of the aliphatic polyester resin.

Additional kneading step may be preferably incorporated, for example, additives and the aliphatic polyester resin are preliminarily dried before kneading, or a vacuum vent extruder is used. In order to reduce the degradation of the resin, the water content during kneading may be controlled to 0.1 weight % or less, suitably 0.05 weight % or less, preferably 0.02 weight % or less, and more preferably 0.005 weight % or less. Dry blending will also be effective in many cases, although the effect depends on the screw shape of the molding machine.

BEST MODE FOR CARRYING OUT OF THE INVENTION

Figure 1:
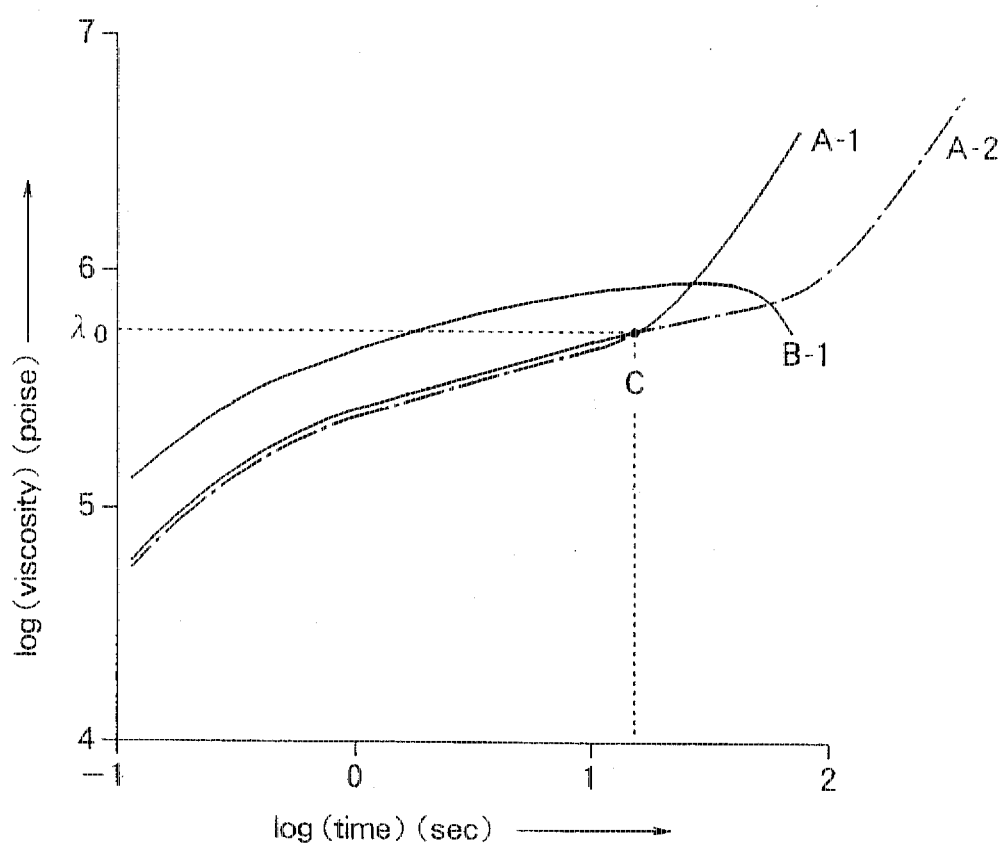
FIG. 1 is a graph illustrating elongational viscosity behaviors of resins used in Example 1 and Comparative Example 1, wherein A-1 represents the result at a strain rate of 0.1 $sec^{-1}$, A-2 represents the result at a strain rate of 0.03 $sec^{-1}$, B-1 represents the result at a strain rate of 0.1 $sec^{-1}$, and C represents a transition point.

The present invention will now be explained with reference to Examples and Comparative Examples. Instruments and conditions for measuring physical properties are as follows:

The molecular weight was determined by GPC as follows:

Instrument: Showa Denko SYSTEM-11

Columns: Shodex GPC K-801+two K-80M+k-800P (both sample and reference sides)

Solvent: Chloroform

Column Temperature: 40° C.

Flow Rate: 1.0 ml/min.

Polymer Concentration: 0.1% by weight

Detector: Shodex RI

Standard for Molecular Weight Determination: PMMA (Shodex M-75)

Injection Volume 0.8 ml/min.

Melt flow index (MFR) was determined at 190° C. under a load of 2.16 kgf, according to JIS K6760.

Swell was determined as follows: 2 cm sample of flow from a melt indexer for the MFR measurement at 190° C. under a load of 2.16 kgf is cut and the diameter measured at a point 5.0 mm from the bottom end. Then, the swell was calculated from the equation below:

$$Swell = \frac{Average\ Diameter - 2.095}{2.095} \times 100(\%)$$

wherein the average diameter means the average of several measurements, and the figure "2.095" means the nozzle diameter of the melt indexer.

The melt viscosity at a shear rate of 100 $sec^{-1}$ was calculated from a graph which shows the relationship between the apparent viscosities and the shear rates measured by a capillary rheometer made by Toyo Seiki Co., Ltd. using a nozzle having a diameter of 1.0 mm and L/D of 10 at a resin temperature of 190° C.

The elongational viscosity was determined as follows: Using the capillary rheometer made by Toyo Seiki Co., Ltd., a uniform strand having a 2.0 to 6.0 mm diameter was prepared at 190° C. The elongational viscosity of the strand was measured using a uniaxial tensile viscometer made by Toyo Seiki at a temperature 30° C. higher than the melting point determined with DSC and at a strain rate of 0.1 $sec^{-1}$. Other conditions are as described above. The melting point was determined by DSC in a nitrogen atmosphere as follows: Using a Perkin Elmer DSC-7, ca. 5 mg of sample was accurately weighed. The sample was heated up from room temperature to 200° C. at a heating rate of 10° C./min., held at 200° C. for 5 min., cooled to −60° C. at a cooling rate of 10° C., held at −60° C. for 5 min., then heated up again to 200° C. at a heating rate of 10° C./min.

Gelation and fish eyes were evaluated with numbers and the size of gelation and fish eyes present in a 20-cm-by-20-cm film having a thickness of ca. 50 microns produced using a biaxial drawing test machine made by Toyo Seiki Co., Ltd. from a 0.5-mm thick sheet prepared by a pressing machine at 190° C.

The heat of combustion was determined according to the calorimetric method in JIS M 8814.

EXAMPLE 1

(Synthesis of an aliphatic polyester resin A1 having long chain branches in accordance with the present invention)

After an 80-liter reactor was substituted with nitrogen, 17.7 kg of 1,4-butanediol, 22.1 kg of succinic acid, and 126 g of trimethylolpropane (corresponding to 0.5 mole % of the succinic acid) were charged therein. After heating-up the reactor in a nitrogen flow, dehydration condensation, i.e., esterification was carried out at 190° to 210° C. for 3.5 hours, further for 5.5 hours under a reduced pressure of 20 to 2 mmHg after stopping the nitrogen flow. The obtained sample had an acid value of 12 mg/g, a number average molecular weight (Mn) of 6,800, and a weight average molecular weight (Mw) of 13,500. Then, 2.0 g of tetraisopropoxytitanium was added as a catalyst in a normal pressure nitrogen flow. Deglycolization was carried out at 210° to 220° C. for 4.5 hours under a reduced pressure of 15 to 0.7 mmHg. The resulting sample had a number average molecular weight (Mn) of 36,450 and a weight average molecular weight (Mw) of 83,400. The theoretical yield of the prepolymer (a1) except for condensed water was 35.4 kg.

Into the reactor containing 35.4 kg of the prepolymer, 3.5 g of phosphorous acid was added as a decoloring agent at 160° C., 35.4 g of Irganox B225 made by Ciba Geigy as an antioxidant and 35.4 g of calcium stearate as a lubricant were added, then they were stirred for 30 minutes.

With stirring, 319 g of hexamethylene diisocyanate (corresponding to 0.90 part by weight to 100 parts by weight of the prepolymer (a1)) was added, then the coupling reaction was performed at 180° to 200° C. for 1.5 hours, for 30 minutes while defoaming under a reduced pressure of 200 to 400 mmHg, then a further 1.5 hours after stopping the stirring (total 3.5 hours). Although the viscosity rapidly increased, no gelation occurred.

The reaction product was extruded into water as 4 strands using dies at 190° to 200° C. by means of the power of the gear pump under the reactor, and these were cut into pellets. The yield of the polyester (A1) was 29 kg after vacuum drying at 90° C. for 3 hours.

The obtained aliphatic polyester resin (A1) having long chain branches in accordance with the present invention was white pellets having a melting point of 114° C., a number average molecular weight (Mn) of 55,100, a weight average molecular weight (Mw) of 221,100, and a MFR (190° C.) of 5.4 g/10 min.

The $\lambda$ value was 5.0, swell was 80%, and the melt viscosity ($\eta a$) at a shear rate of 100 sec$^{-1}$ was $8.0 \times 10^3$. The heat of combustion was 5,800 kcal/kg.

A foamed pipe was produced with a gas foaming molding machine from such a resin (A1) as follows:

Molding machine: tandem gas foaming molding machine produced by Toshiba Kikai Co., Ltd.

First extruder: screw diameter=50 mm, L/D=38

Second extruder: screw diameter=65 mm, L/D=32

Blowing gas: a substituted fron mixture of HCFC142b/HCFC22=60/40

Blowing nucleating additive: talc having an average diameter of 1.5 μm (1% by weight added)

Die: a die for foamed pipe having an outer diameter of 35 mm and an inner diameter of 15 mm.

Designed expansion ratio: 30 times

The first extruder was set at 170° C., and the resin was cooled to 105° C. in the second extruder during foam molding.

A foamed tube having an expansion ratio of 34 times was obtained. No problem was found during foam molding.

Comparative Example 1

(Synthesis of a linear aliphatic polyester resin B1)

After an 80-liter reactor was substituted with nitrogen, 18.3 kg of 1,4-butanediol and 22.4 kg of succinic acid was charged therein. The reactor was heated in a nitrogen flow and esterification due to dehydration condensation was performed at 192° to 220° C. for 3.5 hours, and further for 3.5 hours under a reduced pressure of 20 to 2 mmHg after stopping nitrogen flow. The obtained sample had an acid value of 9.2 mg/g, a number average molecular weight (Mn) of 5,160 and a weight average molecular weight (Mw) of 10,670. Then, 3.4 g of tetraisopropoxytitanium was added as a catalyst in a normal pressure nitrogen flow. Deglycolization was carried out at 215° to 220° C. under a reduced pressure of 15 to 0.2 mmHg for 5.5 hours. The resulting sample had a number average molecular weight (Mn) of 25,200 and a weight average molecular weight (Mw) of 65,400. The theoretical yield of the prepolymer (b1) excluding the condensed water was 33.9 kg.

Then, 34 g of Irganox 1010 (Ciba Geigy) as an antioxidant, 3.4 g of phosphorous acid as a decoloring agent and 34 g of calcium stearate as a lubricant were added then the mixture was stirred for 30 minutes.

Into the reactor containing 33.9 kg of the prepolymer (b1), 356 g of hexamethylene diisocyanate (corresponding to 1.05 parts by weight to 100 parts by weight of the prepolymer (b1)) was added, then coupling was carried out at 190° to 200° C. for 2 hours. Although the viscosity rapidly increased, no gelation occurred.

The product was fed into a kneader from the bottom of the reactor then extruded into water using an extruder. The extruded product was cut into pellets. The yield of the polyester (B1) was 32 kg after drying at 90° C. for 6 hours in vacuum.

The resulting polyester (B1) was white, and had a melting point of 115.6° C., a number average molecular weight (Mn) of 69,800, a weight average molecular wight (Mw) of 167,500, and an MFR (190° C.) of 3.0 g/10 min.

The $\lambda$ value was 1.1, swell was 32%, and $\eta a$ was $1.2 \times 10^4$ poise. The heat of combustion was 5,700 kcal/kg.

The molding test was carried out under the same conditions using the same equipment as Example 1. Because the formed cells had an open cell or open bubble structure, a satisfactory foam article could not be obtained. The apparent expansion ratio was 2.6 times.

Behaviors of the elongational viscosities of resins obtained in Example 1 and Comparative Example 1 are shown in FIG. 1.

Comparative Example 2

A resin was synthesized similar to Example 1, except for the following two modifications:

1) The amount of added trimethylolpropane was 630 g (corresponding to 2.5 mol % of the succinic acid).

2) The amount of added hexamethylene diisocyanate was 35 g (corresponding to 0.1 part by weight to 100 parts by weight of the prepolymer).

The obtained polyester (C1) had a $\lambda$ of 9 or more, swell of 180%, an MFR of 2, and a $\eta a$ of $2.5 \times 10^4$ poise, wherein the $\lambda$ value was not accurate due to sample breakage during the elongational viscosity measurement caused by gelation and fish eyes. The heat of combustion was 5,780 kcal/kg and the melting point was 113.1° C.

The polyester (C1) exhibited poor moldability so that a foam article could not be obtained in the molding test similar to Example 1.

EXAMPLE 2

(Synthesis of an aliphatic polyester copolymer resin D1 having long chain branches in accordance with the present invention)

After an 80-liter reactor was substituted with nitrogen, 17.4 kg of 1,4-butanediol, 17.3 kg of succinic acid, 5.4 kg of adipic acid (molar ratio of succinic acid to adipic acid= 80:20) and 126 g of trimethylolpropane (corresponding to 0.5 mole % of these dicarboxylic acid components) were charged therein. After heating-up the reactor in a nitrogen flow, dehydration condensation, i.e., esterification was carried out at 190° to 210° C. for 3.5 hours, further for 3.5 hours under a reduced pressure of 20 to 2 mmHg after stopping the nitrogen flow. The obtained sample had an acid value of 9.6 mg/g, a number average molecular weight (Mn) of 6,100, and a weight average molecular weight (Mw) of 12,200. Then, 2.0 g of tetraisopropoxytitanium was added as a catalyst in a normal pressure nitrogen flow. Deglycolization was carried out at 210° to 220° C. for 6.5 hours under a reduced pressure of 15 to 0.2 mmHg. The resulting sample had a number average molecular weight (Mn) of 28,250 and a weight average molecular weight (Mw) of 68,910. The theoretical yield of the prepolymer (d1) except for condensed water was 32.6 kg.

Into the reactor containing 32.6 kg of the prepolymer (d1), 34 g of Irganox 1010 made by Ciba Geigy as an antioxidant and 34 g of calcium stearate as a lubricant were added, then they were stirred for 30 minutes.

With stirring, 245 g of hexamethylene diisocyanate (corresponding to 0.75 parts by weight to 100 parts by weight of the prepolymer (d1)) was added, then the coupling reaction was performed at 160° to 190° C. for 2 hours. Although the viscosity rapidly increased, no gelation occurred.

The reaction product was extruded into water and cut into pellets. The yield of the polyester (D1) was 30.0 kg after vacuum drying at 70° C. for 6 hours.

The obtained aliphatic polyester resin (D1) had ivory-like white color and had a melting point of 95.8° C., a heat of solution ($\Delta H$) of 45.3 Joule/g, a number average molecular weight (Mn) of 51,670, a weight average molecular weight (Mw) of 219,180, and an MFR (190° C.) of 4.6 g/10 min.

The $\lambda$ value was 5.3, swell was 83%, and the melt viscosity ($\eta a$) was $6.0 \times 10^3$ poise. The heat of combustion was 5,500 kcal/kg.

The resin (D1) was laminated on kraft paper (120 g/m$^2$) so that the thickness of the resin (D1) was 30 μm using an extruding laminating machine as follows:

Manufacturer: Modern Machinery
Screw diameter: 65 mmφ, L/D=30
Die Width: 1,000 mm
Line Speed: 150 m/min. or 200 m/min.
Resin Temperature in the Die Center: 250° C.
Kraft Paper Substrate: preheated by passing through a preheating roll at 90° C.

The substrate was subjected to a corona treatment just before laminating.

An ozone treatment can also be applied.

At a line speed of 150 m/min., some roll retention was observed, and the neck-in width was 60 mm in one side. The bonding strength was 600 g/15-mm width in the MD direction and 650 g/15-mm width in the TD direction. No film defects due to gelation or fish eyes were found.

Laminating was available even when the line speed increased to 200 m/min. though the neck-in width decreases to 45 mm in one side, the bonding strength decreased to 400 g/15-mm width in the MD direction and 450 g/15-mm width in the TD direction.

Comparative Example 3

(Synthesis of a linear aliphatic polyester copolymer resin E1)

After an 80-liter reactor was substituted with nitrogen, 17.4 kg of 1,4-butanediol, 17.3 kg of succinic acid and 5.4 kg of adipic acid (molar ratio of succinic acid to adipic acid=80:20) were charged therein. After heating-up the reactor in a nitrogen flow, dehydration condensation, i.e., esterification was carried out at 190° to 210° C. for 3.5 hours, further for 3.5 hours under a reduced pressure of 20 to 2 mmHg after stopping the nitrogen flow. The obtained sample had an acid value of 9.6 mg/g, a number average molecular weight (Mn) of 6,100, and a weight average molecular weight (Mw) of 12,200. Then, 2.0 g of tetraisopropoxytitanium was added as a catalyst in a normal pressure nitrogen flow. Deglycolization was carried out at 210° to 220° C. for 6.5 hours under a reduced pressure of 15 to 0.2 mmHg. The resulting sample had a number average molecular weight (Mn) of 26,000 and a weight average molecular weight (Mw) of 69,600. The theoretical yield of the prepolymer (e1) except for condensed water was 32.6 kg.

Into the reactor containing 32.6 kg of the prepolymer (e1), 34 g of Irganox 1010 made by Ciba Geigy as an antioxidant and 34 g of calcium stearate as a lubricant were added, then they were stirred for 30 minutes.

With stirring, 310 g of hexamethylene diisocyanate (corresponding to 0.95 part by weight to 100 parts by weight of the prepolymer (e1)) was added, then the coupling reaction was performed at 160° to 190° C. for 1 hours. Although the viscosity rapidly increased, no gelation occurred.

The reaction product was extruded into water by a kneader-ruder and cut into pellets. The yield of the polyester (E1) was 30.0 kg after vacuum drying at 70° C. for 6 hours.

The obtained aliphatic polyester resin (E1) had an ivory-like white color and had a melting point of 95.8° C., a heat of solution ($\Delta H$) of 45.3 Joule/g, a number average molecular weight (Mn) of 70,440, a weight average molecular weight (Mw) of 153,560, and a MFR (190° C.) of 11.8 g/10 min.

Its $\lambda$ value was 1.2, the swell was 30%, and the melt viscosity ($\eta a$) was $5.0 \times 10^3$ poise. The heat of the combustion was 5,600 kcal/kg.

Next, the molding test concerning extrusion lamination was conducted. As a result, where the line speed of 150 m/min was employed, the neck-in width in one side was remarkably observed, i.e., 240 mm. Further, it tended to adhere to rolls so it was impossible to stably obtain an article.

Comparative Example 4

Example 2 was repeated with the exception that the amount of trimethylol propane added was changed to 756 g (corresponding to 3 mole % of the dicarboxylic acid components) during the synthesis of the copolymer resin D1.

The product obtained had many gelation and F.E., so it could not be measured for $\lambda$ value.

EXAMPLE 3

(Synthesis of an aliphatic polyester copolymer resin F1 having longer chain branches according to the present invention)

After an 80-liter reactor was substituted with nitrogen, 20.0 kg of 1,4-butanediol and 25.0 kg of succinic acid were charged therein. After heating-up the reactor in a nitrogen flow, dehydration condensation, i.e., esterification was carried out at 190° to 220° C. for 3.5 hours, further for 2.5 hours under a reduced pressure of 20 to 1.2 mmHg after stopping the nitrogen flow. The sample obtained had an acid value of 23.1 mg/g. Then, 2.0 g of tetraisopropoxytitanium was added as a catalyst in a normal pressure nitrogen flow. Deglycolization was carried out by increasing the temperature at 210° to 220° C. for 4.5 hours under a reduced pressure of 1.5 to 0.7 mmHg. The resulting sample had a number average molecular weight (Mn) of 24,000, and a weight average molecular weight (Mw) of 47,740. The theoretical yield of the prepolymer (f1) except for condensed water was 36.4 kg.

Into the reactor containing 36.4 kg of the prepolymer (f1), 9 g of phosphorous acid was added as a decoloring agent at 160° C., 36 g of Irganox B225 made by Ciba Geigy as an antioxidant and 36 g of calcium stearate as a lubricant were added, then they were stirred for 30 minutes.

With stirring, 291 g of hexamethylene diisocyanate (corresponding to 0.8 part by weight to 100 parts by weight of the prepolymer (f1)) was added and further stirred for 20 minutes at 160° C., followed by adding 291 g of trimethylolpropane.hexamethylenediisocyanate.adduct (ethyl acetate solution, 75% of active ingredient, 0.8 part by weight relative to 100 parts by weight of the prepolymer, Coronate HL produced by Nihon polyurethane Kogyo Co., Ltd.), then the coupling reaction was performed at 180° to 200° C. for 2 hours. Although the viscosity rapidly increased, no gelation occurred.

The reaction product was extruded into water by a kneader-ruder and cut into pellets. The yield of the aliphatic polyester resin (F1) of the present invention was 32 kg after vacuum drying at 90° C. for 6 hours.

The obtained aliphatic polyester resin (F1) having longer chain branches was white pellets and had a melting point of 116.1° C., a number average molecular weight (Mn) of 65,130, a weight average molecular weight (Mw) of 186,440, and an MFR (190° C.) of 3.5 g/10 min.

The $\lambda$ value was 5.2, swell was 74% and $\eta a$ was $1.2 \times 10^4$ poise.

The polyester (B1) synthesized in Comparative Example 1 and the above resin (F1) were blended with a weight ratio of 60:40 in a tumbling mixer, and pelletized using an extruder made by Tanabe Kikai Co., Ltd. with a vented screw having a diameter of 50 mm$\phi$ and L/D=32, at a resin temperature of 170° C. and a discharge rate 30 kg/h while evacuating. The obtained aliphatic polyester resin (B1/F1= 60/40) in accordance with the present invention had a $\lambda$ value of 2.5, swell of 52%, $\eta a$ of $1.0 \times 10^4$ poise, and an MFR of 3.7 g/10 min.

Using this resin, a sheet having a thickness of 0.7 mm and a width of 840 mm was molded using a sheet forming machine made by Tanabe Kikai Co., Ltd. with a bent screw having a diameter of 65 mm$\phi$, L/D=32, and a die width of 1,000 mm, at a resin temperature at the die outlet of 170° C. and a roll temperature of 40° C. The obtained sheet was subjected to vacuum forming using a vacuum forming machine made by Asano Kenkyusho Co., Ltd. with 49 pudding cup molds (each 70 mm$\phi$ and drawing ratio: 0.8) at a sheet surface temperature of 140° C.

As a result, the resin stably made 100-shots. Further, thickness uniformity was secured after the plug adjustment.

Comparative Example 5

Sheet forming and vacuum forming were carried out using the linear polyester (B1) in Comparative Example 1, similar to Example 3.

Although no problem was found in sheet forming, no satisfactory article was obtainable in vacuum forming due to noticeable sheet sagging.

The sheet sagging was not improved, although vacuum forming was tried after surface temperature had been decreased by 10° C. When vacuum forming was tried after surface temperature was decreased by a further 10° C., holes were observed in the molded article due to unsatisfactory stretching.

EXAMPLE 4

Stretched blow molding according to a hot parison technique using a sample obtained by blending the linear polyester copolymer (E1) of Comparative Example 3 and an aliphatic polyester resin (G1) of the present invention described below was conducted.

(Synthesis of an aliphatic polyester copolymer resin G1 having longer chain branches according to the present invention)

After an 80-liter reactor was substituted with nitrogen, 20.0 kg of 1,4-butanediol and 25.0 kg of succinic acid were charged therein. After heating-up the reactor in a nitrogen flow, dehydration condensation, i.e., esterification was carried out at 190° to 220° C. for 3.5 hours, further for 2.5 hours under a reduced pressure of 20 to 1.2 mmHg after stopping the nitrogen flow. Then, 2.0 g of tetraisopropoxytitanium was added as a catalyst in a normal pressure nitrogen flow. Deglycolization was carried out by increasing the temperature at 210° to 220° C. for 4.5 hours under a reduced pressure of 1.5 to 0.7 mmHg. The resulting sample has a number average molecular weight (Mn) of 25,850, and a weight average molecular weight (Mw) of 53,600. The theoretical yield of the prepolymer (g1) except for condensed water was 36.4 kg.

Into the reactor containing 36.4 kg of the prepolymer (g1), 9 g of phosphorous acid was added as a decoloring agent at 160° C., 36 g of Irganox B225 made by Ciba Geigy as an antioxidant and 36 g of calcium stearate as a lubricant were added, then they were stirred for 30 minutes.

With stirring, 237 g of hexamethylene diisocyanate (corresponding to 0.65 part by weight to 100 parts by weight of the prepolymer (g1)) was added and further stirred for 20 minutes at 160° C., followed by adding 291 g of cyclic hexamethylene diisocyanate trimer (0.95 part by weight relative to 100 parts by weight of the prepolymer, Coronate HX produced by Nihon polyurethane Kogyo Co., Ltd.), then the coupling reaction was performed at 180° to 200° C. for 2 hours. Although the viscosity rapidly increased, no gelation occurred.

The reaction product was extruded into water by a kneader-ruder and cut into pellets. The yield of the aliphatic polyester resin (G1) of the present invention was 28 kg after vacuum drying at 90° C. for 6 hours.

The obtained aliphatic polyester resin (G1) was white pellets and had a melting point of 114° C., a number average molecular weight (Mn) of 74,300, a weight average molecular weight (Mw) of 252,200, and a MFR (190° C.) of 1.77 g/10 min.

The $\lambda$ value was 5.0 and the heat of the combustion, was 5,700 kcal/kg.

The above polyesters E1 and G1, with each polyester including silca and oleamide as a die lubricant, were blended in a weight ratio of 80:20 using a tumbling mixer, then they were pelletized using the extruder and conditions described in Example 3. The obtained aliphatic polyester resin (E1/G1=80/20) had an MFR of 3.0 g/10 min., a λ value of 2.2, swell of 50%, and ηa of $1.2 \times 10^4$ poise.

For stretch blow tests by means of a hot parison technique, a molded article was produced by a stretch blow molder SBIV-100-20 made by Aoki Katashi Kenkyusho Co., Ltd. with a screw having a diameter of 32 mmφ and a die having a transverse stretching ratio of 2.5 and a longitudinal stretching ratio of 1.8, at a nozzle outlet resin temperature of 160° C., a injection mold temperature of 20° C., and a blow mold temperature of 40° C.

The physical properties of the molded article were satisfactory without troubles during the forming process.

Comparative Example 6

A forming test was carried out similar to Example 4, except that the linear polyester (B1) obtained in Comparative Example 1 was used. No satisfactory bottle was obtainable due to bursting during the blow forming process.

EXAMPLE 5

The aliphatic polyester resins (B1/G1=80/20) in accordance with the present invention were subjected to press molding to prepare sheets having a thickness of 0.5 mm at 180° C. Next, the prepared sheets were biaxially oriented using a machine made by Toyo Seiki Co., Ltd. at a temperature of 80°, 85°, 90°, 95°, 100°, 105° and 110° C., respectively to obtain films each having a thicknesses of 40 μm. Stretched films could be prepared at a wide temperature range of from 85° to 110° C. in a satisfactory stretching state. The obtained films were excellent with little gelation or fish eyes and without stretching irregularity.

Comparative Example 7

Films were prepared similar to Example 5, except that the liner polyester (B1) prepared in Comparative Example 3 was used. As a result, the stretching process was possible only in a range from 105° to 110° C.

Stretching irregularity was unsatisfactorily noticeable in comparison with Example 5.

EXAMPLE 6

Using the aliphatic polyester resins (B1/G1=80/20) in accordance with the present invention, a forming test was carried out using an inflation machine described below. Silica and oleamide were added in amounts of 0.1 phr, respectively, as anti-blocking agents.
Inflation machine: Inflation Machine for LLDPE made by Yoshii Tekko Co, Ltd. (Screw size: 55 mmφ, L/D=28)
Die: 100 mmφ (Lip: 1.5 mm, for LLDPE)
Airing: vertical blowing type made by Plakoh Co., Ltd.
Blowing Ratio: 2.6
Film thickness: 30 μm
Drawing Speed: 25 m/min.

During the molding test for 6 hours, film was stably produced. Sampling the film at 7 points every 1 hour, it was observed that the thickness thereof changed within 28 to 31 μm. The anti-blocking property was satisfactory.

Comparative Example 8

A molding test was carried out similar to Example 6, except that the linear polyester (B1) prepared in Comparative Example 1 was used.

As a result, molding stability was not secured, thickness variation was noticeably large, i.e., 22 to 38 μm and the coiled appearance on the paper roll was extremely poor, compared with Example 6. Color slippage and wrinkle will be easily expected during the printing process, although they were not confirmed using the prepared film. Further, because an anti-blocking agent was not added to the resin, the resin readily blocked, resulting in troubles in the opening process.

EXAMPLE 7

(Synthesis of an aliphatic polyester resin H1 having long chain branches in accordance with the present invention)

After an 80-liter reactor was substituted with nitrogen, 17.3 kg of ethylene glycol, 31.8 kg of succinic acid, and 180 g of trimethylolpropane (mole % of 103.5:100:0.5, respectively) were charged therein. After heating-up the reactor in a nitrogen flow, dehydration condensation, i.e., esterification was carried out at 150° to 190° C. for 3.5 hours, further for 3.5 hours under a reduced pressure of 20 to 2 mmHg after stopping the nitrogen flow. The obtained sample had an acid value of 9.8 mg/g, a number average molecular weight (Mn) of 6,120, and a weight average molecular weight (Mw) of 10,020. Then, 5.0 g of tetraisopropoxytitanium was added as a catalyst in a normal pressure nitrogen flow. Deglycolization was carried out at 235° to 245° C. for 19 hours under a reduced pressure of 15 to 0.2 mmHg. The resulting sample had a number average molecular weight (Mn) of 29,030 and a weight average molecular weight (Mw) of 161,210. The theoretical yield of the prepolymer (h1) except for condensed water was 38.8 kg.

The prepolymer (h1) was extruded into water by a kneader-ruder and cut into pellets. The yield of the polyester (H1) was about 34 kg after vacuum drying at 70° C. for 6 hours.

The thus-obtained aliphatic polyester resin (H1) having long chain branches in accordance with the present invention and containing no coupling agent or urethane bond had slightly ivory-like white color and had a melting point of 102.9° C., λ value of 3.5, swell of 60% and an MFR (190° C.) of 0.77 g/10 min.

Further, the melt viscosity (ηa) at a shear rate of 100 sec$^{-1}$ was $2.3 \times 10^4$ poise. The heat of combustion was 4,490 kcal/kg.

The aliphatic polyester resin (H1) was subjected to inflation film forming to obtain a film having a thickness of 30 μm based on the molding conditions in Example 6. Uniform thickness (28 to 31 μm) was obtainable under a stable operation even when the drawing speed was 30 m/min.

Figure 2:
FIG. 2 is a set of schematic views illustrating structural models of a linear polyester (B1), a long chain-branched polyester (A1), a longer chain-branched polyester (F1), and a non-thickened long chain-branched polyester (H1).
Figure 2:
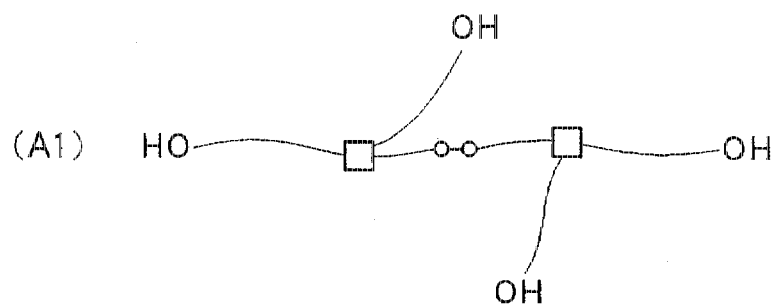
Figure 2:
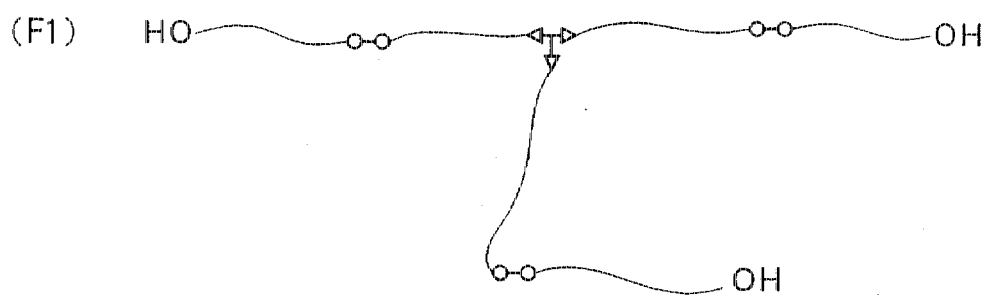
Figure 2:
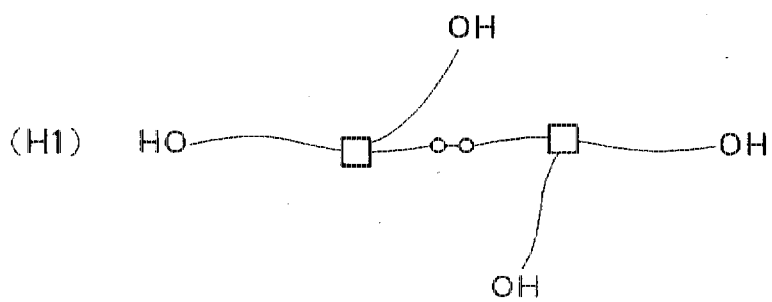
Figure 2:

As a reference, structural models are shown in FIG. 2 on the linear polyester (B1), the long chain branched polyester (A1), the longer chain branched polyester (F1), and the non-thickened long chain-branched polyester not containing a urethane bond (H1) which were obtained in the Examples and Comparative Examples set forth above. In FIG. 2, the mark ○ represents a difunctional coupling agent, □ represents a polyfunctional monomer, and Δ represents a polyfunctional coupling agent.

Comparative Example 9

An aliphatic polyester was synthesized similar to Example 7, except that trimethylolpropane was increased so as to provide a molar % of ethylene glycol:succinic acid:trimethylolpropane=103:100:2.2.

After esterification for 5 hours, the polyester obtained had a number average molecular weight (Mn) of 7,930 and a weight average molecular weight (Mw) of 17,530. Then, the deglycol reaction was carried out. After 3 hours, because the solution was barely stirred due to partial gelation, the reaction was stopped and the solution was taken out from the reactor.

EXAMPLE 8

(Synthesis of an aliphatic polyester copolymer resin $I_1$ having long chain branches in accordance with the present invention)

After an 80-liter reactor was substituted with nitrogen, 14.2 kg of ethylene glycol, 25.7 kg of succinic acid, 1.2 kg of polyethylene glycol (molecular weight=1,000) and 100 g of glycerine (mole % of 51.0:48.5:0.3:0.2, respectively) were charged therein. After heating-up the reactor in a nitrogen flow, dehydration condensation, i.e., esterification was carried out at 150° to 220° C. for 5.0 hours, further for 3.5 hours under a reduced pressure of 20 to 2 mmHg after stopping the nitrogen flow. The obtained sample had an acid value of 1.5 mg/g, a number average molecular weight (Mn) of 4,250, and a weight average molecular weight (Mw) of 6,280. Then, 3.3 g of tetraisopropoxytitanium was added as a catalyst in a normal pressure nitrogen flow. Deglycolization was carried out at 220° to 235° C. for 4.0 hours under a reduced pressure of 4.5 to 0.2 mmHg. The resulting sample had a number average molecular weight (Mn) of 25,370 and a weight average molecular weight (Mw) of 129,450. The theoretical yield of the prepolymer ($i_1$) except for condensed water was 33.4 kg.

Into the reactor containing 33.4 kg of the prepolymer ($i_1$), 3.3 g of phosphorous acid was added as a decoloring agent at 160° C., 34 g of Irganox 1010 made by Ciba Geigy as an antioxidant and 34 g of calcium stearate as a lubricant were added, then they were stirred for 30 minutes.

With stirring, 250 g of hexamethylene diisocyanate (corresponding to 0.8 part by weight to 100 parts by weight of the prepolymer ($i_1$)) was added, then the coupling reaction was performed at 160° to 210° C. for 3 hours. Although the viscosity rapidly increased, no gelation occurred.

The reaction product was extruded into water by a kneader-ruder and cut into pellets. The yield of the polyester ($I_1$) was about 27 kg after vacuum drying at 70° C. for 6 hours.

The thus-obtained aliphatic polyester resin ($I_1$) having long chain branches in accordance with the present invention had slightly ivory-like white color and had a melting point of 102° C., a number-average molecular weight (Mn) of 57,550, a weight-average molecular weight (Mw) of 965,000 (Mw/Mn=16.8) and an MFR (190° C.) of 3.2 g/10 min.

Further, its λ value was 4.0, swell was 65%, the melt viscosity (ηa) at a shear rate of 100 sec$^{-1}$ was 1.4×10$^4$ poise. The heat of the combustion was 4,630 kcal/kg.

The above-mentioned aliphatic polyester resin ($I_1$) was subjected to inflation film forming based on the molding conditions in Example 6, but the some conditions were modified as follows: 150 mmφ as the die size, 170° C. as the temperature, and 10 m/min. as the drawing speed. Moldability was extremely excellent from the start of the film forming.

A film having a thickness of 30 μm and a flat width of 650 mm had mechanical properties shown in Table 1 below.

TABLE 1

| Measurements | | Test direction | |
|---|---|---|---|
| | | MD | TD |
| Yield strength (kg/cm$^2$) | JIS Z1702 | 362 | 245 |
| Break strength (kg/cm$^2$) | JIS Z1702 | 315 | 217 |
| Elongation at break (%) | JIS Z1702 | 120 | 240 |
| Young's modulus (kg/cm$^2$) | ASTM D-882 | 6,100 | 9,300 |
| Tear strength (kg/cm) | JIS K7128 | 3.4 | 4.8 |
| Impact (kg · cm/mm) | JIS P8134 | 30 | |
| Haze (%) | ASTM D-1003 | 28.6 | |
| Gloss (%) | JIS Z1709 | 31.3 | |

Note:
JIS Z1702 (Tensile speed of 500 mm/min)
ASTM D-882 (Tensile speed of 5 mm/min)
JIS P8134 (A hemisphere of 1 inch was employed.)

EXAMPLE 9

(Synthesis of an aliphatic polyester resin J1 having long chain branches in accordance with the present invention)

After an 80-liter reactor was substituted with nitrogen, 19.8 kg of 1,4-cyclohexanedimethanol (trans 70%), 20.1 kg of adipic acid and 63.3 g of glycerine (mole % of 100:100:0.5, respectively) were charged therein. After heating-up the reactor in a nitrogen flow, dehydration condensation, i.e., esterification was carried out at 150° to 220° C. for 3.5 hours, further for 3.5 hours under a reduced pressure of 20 to 1.2 mmHg after stopping the nitrogen flow. The obtained sample had an acid value of 11.6 mg/g. Then, 4.0 g of tetraisopropoxytitanium was added as a catalyst in a normal pressure nitrogen flow. Deglycolization was carried out at 210° to 220° C. for 4.5 hours under a reduced pressure of 1.5 to 0.7 mmHg. The resulting sample had a number average molecular weight (Mn) of 22,750 and a weight average molecular weight (Mw) of 96,675. The theoretical yield of the prepolymer (j1) except for condensed water was 35.0 kg.

Into the reactor containing 35.0 kg of the prepolymer (j1), 9 g of phosphorous acid was added as a decoloring agent at 160° C., 36 g of Irganox B225 made by Ciba Geigy as an antioxidant and 36 g of calcium stearate as a lubricant were added, then they were stirred for 30 minutes.

With stirring, 175.0 g of hexamethylene diisocyanate (corresponding to 0.50 part by weight to 100 parts by weight of the prepolymer (j1)) was added, then the coupling reaction was performed at 180° to 200° C. for 2 hours. Although the viscosity rapidly increased, no gelation occurred.

The reaction product was extruded into water by a kneader-ruder and cut into pellets. The yield of the polyester (J1) was 21.4 kg after vacuum drying at 70° C. for 6 hours.

The thus-obtained aliphatic polyester resin (J1) having long chain branches in accordance with the present invention was white pellet and had a melting point of 103° C., a number-average molecular weight (Mn) of 27,930, a weight-average molecular weight (Mw) of 169,430 (Mw/Mn=6.1) and an MFR (190° C.) of 1.6 g/10 min.

Further, its λ value was 4.5, swell was 70%, the melt viscosity (ηa) at a shear rate of 100 sec$^{-1}$ was 1.5×10$^4$ poise. The heat of the combustion was 5,400 kcal/kg.

The above-mentioned aliphatic polyester resin (J1) was subjected to inflation film forming based on the molding conditions in Example 8, the film of which had a thickness of 30 μm and a flat width of 470 mm. It was possible to stably obtain good transparent film.

EXAMPLE 10

(Synthesis of a soft linear aliphatic polyester copolymer resin K1 having methyl side chains)

After an 80-liter reactor was substituted with nitrogen, 16.4 kg of 1,4-butanediol, 25.3 kg of succinic acid and 3.26 kg of propylene glycol (mole % of 85:100:20, respectively) were charged therein. After heating-up the reactor in a nitrogen flow, dehydration condensation, i.e., esterification was carried out at 150° to 220° C. for 5.0 hours, further for 3.5 hours under a reduced pressure of 20 to 2 mmHg after stopping the nitrogen flow. The obtained sample had an acid value of 19 mg/g, a number average molecular weight (Mn) of 5,800, and a weight average molecular weight (Mw) of 22,900. Then, 3.5 g of tetraisopropoxytitanium was added as a catalyst in a normal pressure nitrogen flow. Deglycolization was carried out at 220° to 235° C. for 3.0 hours under a reduced pressure of 4.5 to 0.2 mmHg. The resulting sample had a number average molecular weight (Mn) of 24,900 and a weight average molecular weight (Mw) of 87,400. The theoretical yield of the polyester ($k_1$) except for condensed water was 35.2 kg.

Into the reactor containing 35.2 kg of the polyester ($k_1$), 3.5 g of phosphorous acid was added as a decoloring agent at 160° C., 35 g of Irganox 1010 made by Ciba Geigy as an antioxidant and 35 g of calcium stearate as a lubricant were added, then they were stirred for 30 minutes.

With stirring, 250 g of hexamethylene diisocyanate (corresponding to 1.1 parts by weight to 100 parts by weight of the prepolymer ($k_1$)) was added, then the coupling reaction was performed at 190° C. for 3 hours. Although the viscosity rapidly increased, no gelation occurred.

The reaction product was extruded into water by means of the power of the gear pump under the reactor and cut into pellets. The yield of the polyester (K1) was about 32 kg after vacuum drying at 70° C. for 6 hours.

The thus-obtained soft linear aliphatic polyester resin (K1) having methyl side chains had slightly ivory-like white color and had a melting point of 96.7° C., a number-average molecular weight (Mn) of 51,200, a weight-average molecular weight (Mw) of 201,900 (Mw/Mn=3.94) and an MFR (190° C.) of 2.6 g/10 min.

Further, its $\lambda$ value was 0.9, swell was 21%, the melt viscosity ($\eta a$) at a shear rate of 100 $sec^{-1}$ was $1.1 \times 10^4$ poise. The heat of combustion was 5,700 kcal/kg.

Sheet forming and vacuum forming were carried out based on the forming conditions in Example 3 using the above-mentioned linear aliphatic polyester copolymer resin (K1) alone. No problem was found in sheet forming, but good pudding cups could not be stably produced due to noticeable sheet sagging in vacuum forming.

This resin (K1) was subjected to dry-blend with the long chain branched polymer A1 in Example 1 in a ratio of 1:1.

The MFR, $\lambda$ value, swell, and $\eta a$ of the composition in accordance with the present invention were 3.2 g/10 minutes, 4.0, 70%, and $1.1 \times 10^4$ poise, respectively.

Sheet forming and vacuum forming tests were carried out using the same machines as those in Example 3, respectively.

No problem was found in the sheet forming test and uniformity in the pudding cup thickness was excellent.

EXAMPLE 11

(Synthesis of an aliphatic polyester L1 having long chain branches)

After an 80-liter reactor was substituted with nitrogen, 18.2 kg of 1,4-butanediol, 25.2 kg of succinic acid, 1.62 kg of propylene glycol and 98 g of glycerine (mole % of 95:100:10:0.5, respectively) were charged therein. After heating-up the reactor in a nitrogen flow, dehydration condensation, i.e., esterification was carried out at 150° to 220° C. for 7.5 hours, further for 2.0 hours under a reduced pressure of 24 to 10 mmHg after stopping the nitrogen flow. The obtained sample had an acid value of 16 mg/g, a number average molecular weight (Mn) of 6,400, and a weight average molecular weight (Mw) of 10,600. Then, 3.5 g of tetraisopropoxytitanium was added as a catalyst in a normal pressure nitrogen flow. Deglycolization was carried out at 215° to 220° C. for 16 hours under a reduced pressure of 2 to 0.2 mmHg. The sample obtained from upper liquid of the reactor had a number average molecular weight (Mn) of 48,400 and a weight average molecular weight (Mw) of 277,300. The theoretical yield of the polyester (L1) except for condensed water was 35.2 kg.

The reaction product was extruded into water by means of the power of the gear pump under the reactor and cut into pellets. The yield of the polyester (L1) was about 35.2 kg after vacuum drying at 70° C. for 6 hours.

The thus-obtained aliphatic polyester (L1) having no coupling agent or urethane bond had slightly ivory-like white color and had a melting point of 108.7° C., a number-average molecular weight (Mn) of 41,200, a weight-average molecular weight (Mw) of 167,000 (Mw/Mn=4.1) and an MFR (190° C.) of 16.4 g/10 min.

Further, its $\lambda$ value was 6.3, swell was 92%, the melt viscosity ($\eta a$) at a shear rate of 100 $sec^{-1}$ was $4.2 \times 10^3$ poise.

The extrusion laminate forming were carried out based on the forming conditions in Example 2 using the above-mentioned aliphatic polyester. The sample obtained had neck-in in one side of 50 mm where the line speed was 150 m/min. The bonding strength of the laminate could not be measured because picking occurred showing that the bonding strenth was excellent (both of MD and TD directions of at least 650 g/mm width).

EXAMPLE 12

The lamination to paper was conducted using a blend of the aliphatic polyester (L1) of Example 11 and the aliphatic polyester resin (M1) illustrated below.

(Synthesis of the aliphatic polyester copolymer resin M1 having longer chain branches of the present invention)

After an 80-liter reactor was substituted with nitrogen, 17.4 kg of 1,4-butanediol, 17.3 kg of succinic acid and 5.4 kg of adipic acid were charged therein. After heating-up the reactor in a nitrogen flow, dehydration condensation, i.e., esterification was carried out at 190° to 210° C. for 3.5 hours, further for 3.5 hours under a reduced pressure of 20 to 2 mmHg after stopping the nitrogen flow. The obtained sample had an acid value of 10 mg/g. Then, 2.0 g of tetraisopropoxytitanium was added as a catalyst in a normal pressure nitrogen flow. Deglycolization was carried out at 210° to 220° C. for 6.5 hours under a reduced pressure of 15 to 0.2 mmHg. The resulting sample had a number average molecular weight (Mn) of 26,000 and a weight average molecular weight (Mw) of 69,600. The theoretical yield of the polyester (m1) except for condensed water was 32.6 kg.

Into the reactor containing 32.6 kg of the polyester (m1), 9 g of phosphorous acid was added as a decoloring agent at 160° C., 34 g of Irganox 1010 made by Ciba Geigy as an antioxidant and 34 g of calcium stearate as a lubricant were added, then they were stirred for 30 minutes.

With stirring, 237 g of hexamethylene diisocyanate (corresponding to 0.65 part by weight to 100 parts by weight of the prepolymer (m1)) was added and stirred for 20 min at 160° C., then 291 g of cyclic hexamethylenediisocyanate trimer (0.70 part by weight to 100 parts by weight of the prepolymer, Colonate HX produced by Nihon Polyurethane Kogyo Co., Ltd.) was added thereto and the coupling reaction was performed at 180° to 200° C. for 2 hours. Although the viscosity rapidly increased, no gelation occurred.

The reaction product was extruded into water by means of the power of the gear pump under the reactor and cut into pellets. The yield of the aliphatic polyester copolymer resin (M1) of the present invention was 25 kg after drying by dehumidified air at 70° C. for 6 hours.

The thus-obtained resin (M1) was white pellets and had a melting point of 97.4° C., a number-average molecular weight (Mn) of 58,600, a weight-average molecular weight (Mw) of 293,000 and an MFR (190° C.) of 9.14 g/10 min.

Further, its λ value was 2.4, swell was 46%, the melt viscosity (ηa) at a shear rate of 100 sec$^{-1}$ was $0.58 \times 10^4$ poise.

After dry blending the D1 having long chain branches of Example 2 and the M1 synthesized by this Example with the blend ratio of 1:1, respectively, pelletizing was carried out using a pelletizer produced by Tanabe Kikai Co., Ltd. (screw diameter of 40 mmφ, L/D=32, bent-type extruder) while controlling the resin temperature of the die outlet to 170° C.

The thus-obtained pellets were subjected to vacuum drying at 70° C. for 5 hours, then to extrusion laminate forming in accordance with Example 2.

As a result, even if the line speed of 150 m/min was employed, adhesion to rolls did not occur. The neck-in on one side was 58 mm. Further, the bonding strengths of MD and TD directions were 550 g/15 mm width and 600 g/15 mm width, respectively.

Furthermore, the MFR, λ value, swell, and ηa of the resin used in the above forming were 10 g/10 minutes, 6.0, 90%, and $6.2 \times 10^3$ poise, respectively.

EXAMPLE 13

(Synthesis of a soft linear aliphatic polyester copolymer resin N1 having long chain branches and methyl side chains)

After an 80-liter reactor was substituted with nitrogen, 15.0 kg of ethylene glycol, 92 g of propylene glycol, 27.2 kg of succinic acid, 1.77 kg of adipic acid and 111 g of glycerine (mole % of 100:5:95:5:0.50, respectively) were charged therein. After heating-up the reactor in a nitrogen flow, dehydration condensation, i.e., esterification was carried out at 150° to 225° C. for 7.5 hours, further for 2.0 hours under a reduced pressure of 20 to 12 mmHg after stopping the nitrogen flow. The obtained sample had an acid value of 21 mg/g, a number average molecular weight (Mn) of 4,540, and a weight average molecular weight (Mw) of 6,470. Then, 3.3 g of tetraisopropoxytitanium was added as a catalyst in a normal pressure nitrogen flow. Deglycolization was carried out at 220° to 235° C. for 4.0 hours under a reduced pressure of 4.5 to 0.2 mmHg. The resulting sample had a number average molecular weight (Mn) of 23,500 and a weight average molecular weight (Mw) of 66,600. The theoretical yield of the polyester (n$_1$) except for condensed water was 36.3 kg.

Into the reactor containing 36.3 kg of the polyester (n$_1$), 3.4 g of phosphorous acid was added as a decoloring agent at 160° C., 34 g of Irganox 1010 made by Ciba Geigy as an antioxidant and 34 g of calcium stearate as a lubricant were added, then they were stirred for 30 minutes.

With stirring, 248 g of hexamethylene diisocyanate (corresponding to 0.73 part by weight to 100 parts by weight of the prepolymer (n$_1$)) was added, then the coupling reaction was performed at 180° to 190° C. for 3 hours. Although the viscosity rapidly increased, no gelation occurred.

The reaction product was extruded into water through a die by means of the power of the gear pump under the reactor and cut into pellets. The yield of the polyester (N1) was about 15 kg after drying by dehumidified air at 70° C. for 6 hours.

The thus-obtained aliphatic polyester resin (N1) having long chain branches was slightly ivory-like white pellets and had a melting point of 90.5° C., a number-average molecular weight (Mn) of 38,000, a weight-average molecular weight (Mw) of 292,600 (Mw/Mn=7.7) and an MFR (190° C.) of 1.3 g/10 min.

Further, its λ value was 5.5, swell was 95%, the melt viscosity (ηa) at a shear rate of 100 sec$^{-1}$ was $1.6 \times 10^4$ poise.

Using this resin, gas foam molding was carried out similar to Example 1, except that the resin temperature during the molding process was 96° C. at the outlet of the second extruder. A foamed tube having an expansion ratio of 28 times could be molded as a result. No problem was found during foam molding.

EXAMPLE 14

(Synthesis of an aliphatic polyester O1 having long chain branches and having no urethane bond)

After an 80-liter reactor was substituted with nitrogen, 17.4 kg of 1,4-butanediol, 17.3 kg of succinic acid, 5.4 kg of adipic acid and 252 g of trimethylol propane (mole % of 105:80:20:1.0, respectively) were charged therein. After heating-up the reactor in a nitrogen flow, dehydration condensation, i.e., esterification was carried out at 190° to 210° C. for 3.5 hours, further for 3.5 hours under a reduced pressure of 20 to 2 mmHg after stopping the nitrogen flow. The obtained sample had an acid value of 10 mg/g, a number average molecular weight (Mn) of 7,650, and a weight average molecular weight (Mw) of 16,500. Then, 2.0 g of tetraisopropoxytitanium (corresponding to 0.005 part by weight relative to 100 parts by weight of the polymer) was added as a catalyst in a normal pressure nitrogen flow. The first deglycolization was carried out at 210° to 220° C. for 6.5 hours under a reduced pressure of 5 to 0.8 mmHg using a vacuum oil pump. The resulting sample had a number average molecular weight (Mn) of 27,000 and a weight average molecular weight (Mw) of 70,500. The internal pressure of the reaction system was maintained to 0.8 mmHg at the above temperature, then the pump was changed to a vacuum pump produced by Deutsch.Rietscheri and the second deglycolization was carried out for 8 hours under a highly reduced pressure of 0.7 to 0.2 mmHg. The theoretical yield of the aliphatic polyester (O1) except for 6.7 kg of condensed water was 33.5 kg. The yield extruded from the reactor was about 30 kg.

After vacuum drying at 70° C. for 6 hours, the aliphatic polyester (O1) obtained was slightly ivory-like white pellets and had a melting point of 95° C., a number-average molecular weight (Mn) of 75,700, a weight-average molecular weight (Mw) of 225,000 (Mw/Mn=3.0) and an MFR (190° C.) of 1.7 g/10 min.

Further, its λ value was 7.9, swell was 135%, the melt viscosity (ηa) at a shear rate of 100 sec$^{-1}$ was 1.4×10$^4$ poise. The heat of the combustion was 5,720 kcal/kg.

Using this resin, gas foam molding was carried out as described in Example 1 with the exception that the resin temperature during the molding process was 89° C. at the outlet of the second extruder. A foamed tube having an expansion ratio of 27 times could be molded as a result.

EXAMPLE 15

(Synthesis of an aliphatic polyester P1 having a linear structure and having no urethane bond)

After an 80-liter reactor was substituted with nitrogen, 20.9 kg of 1,4-butanediol, 17.7 kg of succinic anhydride and 6.45 kg of adipic acid were charged therein. After heating-up the reactor in a nitrogen flow, dehydration condensation, i.e., esterification was carried out at 190° to 220° C. for 2.5 hours, further for 2.5 hours under a reduced pressure of 20 to 2 mmHg after stopping the nitrogen flow. The obtained sample had an acid value of 9.0 mg/g, a number average molecular weight (Mn) of 7,600, and a weight average molecular weight (Mw) of 14,250. Then, 2.0 g of tetraisopropoxytitanium (corresponding to 0.01 part by weight relative to 100 parts by weight of the polymer) was added as a catalyst in a normal pressure nitrogen flow. The first deglycolization was carried out at 215° to 220° C. for 4.5 hours under a reduced pressure of 5 to 0.8 mmHg using a vacuum oil pump. The resulting sample had a number average molecular weight (Mn) of 27,300 and a weight average molecular weight (Mw) of 69,000. The internal pressure of the reaction system was maintained to 0.8 mmHg at the above temperature, then the pump was changed to a vacuum pump produced by Deutsch.Rietscheri and the second deglycolization was carried out for 8 hours under a highly reduced pressure of 0.7 to 0.2 mmHg. The theoretical yield of the aliphatic polyester (P1) except for 4.77 kg of condensed water was 40.2 kg. The yield extruded from the reactor was about 30 kg.

After vacuum drying at 70° C. for 6 hours, the aliphtic polyester (P1) obtained was slightly ivory-like white pellet and had a melting point of 96° C., a number-average molecular weight (Mn) of 82,300, a weight-average molecular weight (Mw) of 205,700 (Mw/Mn=2.5) and an MFR (190° C.) of 1.2 g/10 min.

Further, its λ value was 1.4, swell was 38%, the melt viscosity (ηa) at a shear rate of 100 sec$^{-1}$ was 1.7×10$^4$ poise.

After dry blending the O$_1$ having long chain branches and having no urethane bond of Example 14 and the P1 synthesized by this Example with the blend weight ratio of 30:70, respectively, pelletizing was carried out using pelletizer produced by Tanabe Kikai Co., Ltd. (used in Example 12) while controlling the resin temperature of the die outlet to 180° C. Next, the pellets obtained were again kneaded followed by vacuum drying at 70° C. for 5 hours.

The white pellets consisting of the composition of the present invention had an MFR (190° C.) of 1.5 g/10 min, λ value of 2.6, swell of 46% and ηa of 1.5×10$^4$ poise.

EXAMPLE 16

(Synthesis of an aliphatic polyester resin (Q1) having long chain branches according to the present invention)

After an 80-liter reactor was substituted with nitrogen, 20.0 kg of 1,4-butanediol, 24.9 kg of succinic acid, 610 g of diethyl oxalate and 212 g of trimethylol propane (mole % of 105:99:2:1.5, respectively) were charged therein. After heating-up the reactor in a nitrogen flow, dehydration condensation, i.e., esterification was carried out at 190° to 210° C. for 3.5 hours, further for 5.5 hours under a reduced pressure of 20 to 2 mmHg after stopping the nitrogen flow. The obtained sample had an acid value of 9.6 mg/g, a number average molecular weight (Mn) of 6,900, and a weight average molecular weight (Mw) of 17,800. Then, 4.5 g of tetraisopropoxytitanium was added as a catalyst in a normal pressure nitrogen flow. Deglycolization was carried out at 210° to 220° C. for 4.5 hours under a reduced pressure of 15 to 0.7 mmHg. The resulting sample had a number average molecular weight (Mn) of 33,100 and a weight average molecular weight (Mw) of 95,200. The theoretical yield of the prepolymer (q1) except for condensed water was 37.0 kg.

Into the reactor containing 37.0 kg of the prepolymer (q1), 3.5 g of phosphorous acid was added as a decoloring agent at 160° C., 35 g of Irganox B225 made by Ciba Geigy as an antioxidant and 35 g of calcium stearate as a lubricant were added, then they were stirred for 30 minutes.

With stirring, 407 g of hexamethylene diisocyanate (corresponding to 1.10 parts by weight to 100 parts by weight of the prepolymer (q1)) was added, then the coupling reaction was conducted at 170° to 190° C. for 1.5 hours. Subsequently, defoaming was conducted under a reduced pressure of 200 to 400 mmHg for 30 min. Then, after stopping the stirring, the coupling reaction was further performed by standing the solution for 1.5 hours (total coupling reaction time was 3.5 hours). Although the viscosity rapidly increased, no gelation occurred.

The reaction product was extruded into water as four strands through a die at 190° to 200° C. by means of the power of the gear pump under the reactor and cut into pellets. The yield of the polyester (Q1) was about 29 kg after vacuum drying at 80° C. for 3 hours.

The thus-obtained aliphatic polyester resin (Q1) having long chain branches of the present invention was light yellow pellets having a melting point of 114° C., a number-average molecular weight (Mn) of 61,100, a weight-average molecular weight (Mw) of 199,000 and an MFR (190° C.) of 5.8 g/10 min.

Further, its λ value was 7.7, swell was 118%, the ηa was 9.0×10$^3$. The heat of combustion was 5,800 kcal/kg.

Using this resin (Q1), gas foam molding was carried out similar to Example 1, except that the resin temperature during the molding process was 95° C. at the outlet of the second extruder. A foamed tube having an expansion ratio of 30 times could be molded as a result.

Biodegradability was studied on the various polyesters prepared in the above described Examples and Comparative Examples. Results are shown in Table 2. Biodegradation tests were carried out by a compost method. That is, into city garbage including degradation bacteria (offered by Komoro City), water was added so that the water content became 50% of the maximum water holding quantity, and tests were carried out at an average temperature of 55° C. Figures in Table 2 represent the ratio (%) of the decreased weight to the initial weight. The term "unmeasurable" in Table 2 means the weight could not be measured due to a crumbled sample or a sample that was completely decomposed.

TABLE 2

| | Resin | Shape | 1 week | 2 weeks | 4 weeks | 6 weeks | 8 weeks | 10 weeks | 12 weeks |
|---|---|---|---|---|---|---|---|---|---|
| Ex. 1 | A1 | 1-mm sliced foam (34 times) | -2% | -6% | -50% | -70% | unmeasurable | — | — |
| Com. 1 | B1 | Foam (2.6 times) | -3% | -8% | -55% | unmeasurable | — | — | — |
| Com. 2 | C1 | 0.5-mm sheet | -5% | -8% | -60% | -75% | unmeasurable | — | — |
| Ex. 2 | D1 | Laminate to kraft paper (D1 = 30 μm) | -10% | -30% | -80% | unmeasurable | — | — | — |
| Com. 3 | E1 | Laminate to kraft paper (E1 = 30 μm) | -12% | -35% | -85% | unmeasurable | — | — | — |
| Ex. 3 | B1/F1 | 0.7-mm sheet | -5% | -10% | -55% | -65% | unmeasurable | — | — |
| Com. 5 | B1 | 0.7-mm sheet foam (34 times) | -5% | -12% | -57% | -60% | unmeasurable | — | — |
| Ex. 4 | E1/G1 | Stretch blow molded bottle | -5% | -12% | -40% | -60% | -75% | unmeasurable | — |
| Ex. 5 | B1/G1 | 40-μm biaxially oriented film | -3% | -8% | -50% | -75% | unmeasurable | — | — |
| Ex. 6 | B1/G1 | 30-μm inflation film | -3% | -10% | -60% | unmeasurable | — | — | — |
| Com. 8 | B1 | 30-μm inflation film | -3% | -12% | -58% | unmeasurable | — | — | — |
| Ex. 7 | H1 | 30-μm inflation film | -10% | -30% | -80% | unmeasurable | — | — | — |
| Ex. 8 | $I_1$ | 30-μm inflation film | -10% | -32% | -78% | unmeasurable | — | — | — |
| Ex. 9 | J1 | 30-μm inflation film | -0% | -2% | -10% | -18% | -32% | -52% | -70% |
| Ex. 10 | K1/A1 | 0.7-mm sheet | -4.5% | -15% | -72% | unmeasurable | — | — | — |
| Ex. 10 | K1 | 0.7-mm sheet | -6% | -20% | -85% | unmeasurable | — | — | — |
| Ex. 11 | L1 | Laminate to kraft paper (L1 = 30 μm) | -5% | -14% | -53% | -63% | unmeasurable | — | — |
| Ex. 12 | M1 | Laminate to kraft paper (M1 = 30 μm) | -6% | -13% | -46% | -71% | unmeasurable | — | — |
| Ex. 13 | N1 | 1-mm sliced foamed tube | -8% | -25% | -35% | -75% | unmeasurable | — | — |
| Ex. 14 | $O_1$ | 1-mm sliced foamed tube | -10% | -27% | -72% | unmeasurable | — | — | — |
| Ex. 15 | P1/$O_1$ | 30-μm inflation film | -12% | -35% | -80% | unmeasurable | — | — | — |
| Ex. 16 | Q1 | 1-mm sliced foamed tube | -3% | -8% | -56% | -66% | unmeasurable | — | — |

Industrial Applicability

According to the present invention, the aliphatic polyester resin having biodegradability, physical properties sufficient for practical use and specific melting properties and a method for producing same are provided. The aliphatic polyester resin of the present invention has excellent characteristics represented by formability and forming stability.

What is claimed is:

1. An aliphatic polyester resin having a λ value representing the magnitude of non-linearity of elongational viscosity of 1.5 to 8.0, said λ value being defined by the following formula (1):

$$\lambda = \lambda_1 / \lambda_0 \tag{1}$$

wherein $\lambda_0$ denotes the elongational viscosity at a transition point and $\lambda_1$ denotes the elongational viscosity when strain becomes twice that of the strain at the transition point, wherein the transition point means the point between a linear region (infinitesimal-deformation region) and a non-linear region (large-deformation region),
wherein the aliphatic polyester resin is mainly constituted by an aliphatic glycol and an aliphatic dicarboxylic acid or anhydride, the resin being obtained by reacting a prepolymer having a weight-average molecular weight (Mw) of at least 20,000 with polyisocyanate, wherein the resin has a weight-average molecular weight (Mw) of at least 60,000 and is provided with long chain branched formation.

2. The aliphatic polyester resin of claim 1 wherein at least one part of the polyisocyanate is trimethylol propane.hexamethylene diisocyanate.adduct, cyclic hexamethylene diisocyanate trimer or hexamethylene diisocyanate.water.adduct.

3. The aliphatic polyester resin of claim 1 wherein the resin has a unit selected from the group consisting of ethylene glycol, propylene glycol, butanediol, 1,6-hexanediol, decamethylene glycol, neopentyl glycol and 1,4-cyclohexanedimethanol as an aliphatic glycol unit, and has a unit selected from the group consisting of oxalic acid, succinic acid, adipic acid, suberic acid, sebasic acid, dodecanoic acid, succinic anhydride and adipic anhydride as an aliphatic dicarboxylic acid unit.

4. The aliphatic polyester resin of claim 1 wherein the resin has a weight-average molecular weight (Mw) of at least 100,000.

5. An aliphatic polyester resin having a λ value representing the magnitude of non-linearity of elongational viscosity of 1.5 to 8.0, said λ value being defined by the following formula (1):

$$\lambda = \lambda_1 / \lambda_0 \tag{1}$$

wherein $\lambda_0$ denotes the elongational viscosity at a transition point and $\lambda_1$ denotes the elongational viscosity when strain becomes twice that of the strain at the transition point, wherein the transition point means the point between a linear region (infinitesimal-deformation region) and a non-linear region (large-deformation region), wherein the aliphatic polyester resin is mainly constituted by an aliphatic glycol and an aliphatic dicarboxylic acid or anhydride, the resin being obtained by reacting the glycol and the dicarboxylic acid with at least one polyfunctional compound selected from the group consisting of a tri- or more polyol, a tri- or more oxycarboxylic acid or anhydride and a tri- or more polycarboxylic acid or anhydride, wherein the resin has a weight-average molecular weight (Mw) of at least 20,000 and is provided with long chain branched formation.

6. The aliphatic polyester resin of claim 5 wherein the resin contains at least one member selected from the group consisting of trimethylol propane, glycerine and pentaerythritol.

7. The aliphatic polyester resin of claim 5 wherein the resin contains at least one member selected from the group consisting of trimesic acid, propane tricarboxylic acid, trimellitic anhydride, pyromellitic anhydride, benzophenone tetracarboxylic anhydride, cyclopentane tetracarboxylic acid, malic acid, citric acid and tartaric acid.

8. The aliphatic polyester resin of claim 5 wherein the resin has a unit selected from the group consisting of ethylene glycol, propylene glycol, butanediol, 1,6-hexanediol, decamethylene glycol, neopentyl glycol and 1,4-cyclohexanedimethanol as an aliphatic glycol unit, and has a unit selected from the group consisting of oxalic acid, succinic acid, adipic acid, suberic acid, sebasic acid, dodecanoic acid, succinic anhydride and adipic anhydride as an aliphatic dicarboxylic acid unit.

9. The aliphatic polyester resin of claim 1 wherein the resin is obtained from reactants consisting of the prepolymer and the polyisocyanate.

10. The aliphatic polyester resin of claim 5 wherein the resin is obtained from reactants consisting of the glycol, the dicarboxylic acid and the at least one polyfunctional compound selected from the group consisting of a tri- or more polyol, a tri- or more oxycarboxylic acid or anhydride and a tri- or more polycarboxylic acid or anhydride.

11. A method for producing an aliphatic polyester resin comprising blending 3 to 500 parts by weight of the aliphatic polyester resin in any one of claims 1 to 8 with 100 parts by weight of an aliphatic polyester resin having a $\lambda$ value indicating the magnitude of non-linearity of the elongational viscosity of 1.5 or less so that the $\lambda$ value becomes a specific value in a range of 1.5 to 8.0.

12. A method for producing an aliphatic polyester resin comprising blending 3 to 500 parts by weight of the aliphatic polyester resin in any one of claims 1 to 8 with 100 parts by weight of an aliphatic polyester resin having swell measured at 190° C. of 40% or less so that the swell becomes a specific value in a range of 40 to 200%.

* * * * *